(12) United States Patent
Wang et al.

(10) Patent No.: US 8,982,811 B2
(45) Date of Patent: Mar. 17, 2015

(54) TRAFFIC BEARER MAPPING METHOD AND COMMUNICATION DEVICE

(75) Inventors: Ke Wang, Shanghai (CN); Ningjuan Chang, Shanghai (CN); Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 13/330,311

(22) Filed: Dec. 19, 2011

(65) Prior Publication Data
US 2012/0092994 A1    Apr. 19, 2012

Related U.S. Application Data

(63) Continuation of application No. PCT/CN2010/074036, filed on Jun. 18, 2010.

(30) Foreign Application Priority Data

Jun. 19, 2009    (CN) .......................... 2009 1 0139406

(51) Int. Cl.
*H04W 4/00*    (2009.01)
*H04W 72/08*    (2009.01)
(Continued)

(52) U.S. Cl.
CPC ........... *H04W 72/087* (2013.01); *H04L 45/302* (2013.01); *H04B 7/2606* (2013.01); *H04W 84/047* (2013.01)
USPC ....................................................... 370/329

(58) Field of Classification Search
CPC ..... H04W 84/12; H04W 80/04; H04W 80/18; H04W 88/06; H04W 74/08; H04W 84/18
USPC ....................................................... 370/235
See application file for complete search history.

(56) References Cited

U.S. PATENT DOCUMENTS

| 2004/0156334 A1 | 8/2004 | Okubo |
| 2008/0037491 A1 | 2/2008 | Shaheen |

(Continued)

FOREIGN PATENT DOCUMENTS

| CN | 1513274 A | 7/2004 |
| CN | 1933362 A | 3/2007 |

(Continued)

OTHER PUBLICATIONS

Chinese Patent No. 101932102, issued on Jan. 23, 2013, granted in corresponding Chinese Patent Application No. 200910139406.7.

(Continued)

*Primary Examiner* — Warner Wong
(74) *Attorney, Agent, or Firm* — Brinks, Gilson & Lione

(57) ABSTRACT

Embodiments of the present invention provide a traffic bearer mapping method and a communication device. The traffic bearer mapping method includes: obtaining attribute information of a traffic data flow of a user; selecting a relay transmission tunnel according to the attribute information of the traffic data flow of the user; and mapping the received traffic data flow to the relay transmission tunnel for transmission, where the relay transmission tunnel includes a relay link radio bearer Un RB or a bearer including the Un RB. According to the embodiments of the present invention, transmission of a traffic data flow in an LTE-A network after a relay node is introduced into is implemented, thereby ensuring quality of service of multi-service.

14 Claims, 20 Drawing Sheets

(51) Int. Cl.
  *H04L 12/725* (2013.01)
  *H04B 7/26* (2006.01)
  *H04W 84/04* (2009.01)

(56) References Cited

U.S. PATENT DOCUMENTS

| | | |
|---|---|---|
| 2008/0080403 A1 | 4/2008 | Guo |
| 2008/0212478 A1 | 9/2008 | Devarapalli et al. |
| 2009/0103514 A1 | 4/2009 | Hwang et al. |
| 2010/0008238 A1* | 1/2010 | Harada et al. ............. 370/252 |

FOREIGN PATENT DOCUMENTS

| | | |
|---|---|---|
| CN | 1980187 A | 6/2007 |
| CN | 101106794 A | 1/2008 |
| CN | 101123789 A | 2/2008 |
| CN | 101128040 A | 2/2008 |
| CN | 101132564 A | 2/2008 |
| CN | 101132613 A | 2/2008 |
| EP | 1998512 A1 | 12/2008 |
| WO | WO 2007/071816 A2 | 6/2007 |
| WO | WO 2007/129199 A2 | 11/2007 |

OTHER PUBLICATIONS

Office Action issued in corresponding European Patent Application No. 10788952.9, mailed Feb. 20, 2013.
Office Action issued in corresponding Chinese Patent Application No. 200910139406.7, mailed Jun. 19, 2012.
Search Report issued in corresponding Chinese Patent Application No. 200910139406.7, mailed Jun. 19, 2012.
Extended European Search Report issued in corresponding European Patent Application No. 10788952.9, mailed Feb. 16, 2012.
Written Opinion of the International Searching Authority issued in corresponding PCT Patent Application No. PCT/CN2010/074036, mailed Sep. 23, 2010.
International Search Report issued in corresponding PCT Patent Application No. PCT/CN2010/074036, mailed Sep. 23, 2010.
LG Electronics, "Bearer Mapping in Relay Node" Agenda Item 7, 3GPP TSG-RAN2 Meeting #66. San Francisco, CA, May 4-8, 2009. R2-092845.
RAN3 LTE-A Rapporteur, "LTE-A RAN3 Baseline Document" Agenda Item 13, 3GPP TSG WG3 Meeting #64. San Francisco, CA, May 4-8, 2009. R3-091447.
ZTE, "Protocol Architecture of Relay" Agenda Item 13.1, 3GPP TSG-RAN WG3 Meeting #64. San Francisco, CA, May 4-8, 2009. R3-091194.
LTE, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description" Stage 2 (Release 9) 3GPP TS 36.300. V9.0.0, Jun. 2009.
LTE, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 8) 3GPP TS 23.401. V8.6.0, Jun. 2009.

\* cited by examiner

TRAFFIC BEARER MAPPING METHOD AND COMMUNICATION DEVICE

CROSS-REFERENCE TO RELATED APPLICATIONS

This application is a continuation of International Application No. PCT/CN2010/074036, filed on Jun. 18, 2010, which claims priority to Chinese Patent Application No. 200910139406.7, filed on Jun. 19, 2009, both of which are hereby incorporated by reference in their entireties.

FIELD OF THE INVENTION

The present invention relates to the field of communication technologies, and in particular, to a traffic bearer mapping method and a communication device.

BACKGROUND OF THE INVENTION

A conventional cellular network (for example, an LTE network) is a single-hop network using a base station as a center, that is, data is directly interactively transmitted between the base station (eNB, Evolved Node Base Station) and a user equipment (UE, User Equipment). After a relay node (RN, Relay node) is introduced into an LTE-A protocol, multi-hop transmission exists in the interactive transmission of data between the base station and the user equipment, that is, the interactive transmission of data between the base station and the user equipment is required to pass through the relay node RN. As shown in FIG. 1, in an LTE-A network after the relay node RN is introduced, a transmission link between the user equipment and the base station may be divided into two segments, that is, an access link Uu, which is an air interface link between the user equipment and the directly associated relay node RN; and a relay link Un, which is an air interface link between the relay node RN and the base station eNB.

In an existing LTE network, in order to ensure quality of service (Qos, Quality of Service) of multi-service, a traffic bearer mapping mechanism is introduced. The bearer mapping of the traffic data flow in an LTE network is as shown in FIG. 2, where the LTE network includes a user equipment 1, a base station 2, a serving gateway (S-GW, Serving Gateway) 3, and a packet data network gateway (P-GW, PDN Gateway) 4. A Un radio bearer (Uu RB, Uu Radio Bearer) 5, an S1 bearer 6, and an S5/S8 bearer 7 that correspond to the user equipment 1 form an evolved packet system (EPS, Evolved Packet System) bearer. Trapezoid frames in the user equipment 1 and the packet data network gateway 4 represent a traffic flow template (TFT, Traffic Flow Template) operation.

An uplink traffic bearer mapping process in the existing LET network is as follows: The user equipment 1 maps the uplink traffic flow to an EPS bearer through an uplink traffic flow template (UL TFT, Uplink Traffic Flow Template); a one-to-one mapping between the UL TFT and the Uu radio bearer 5 is implemented by the user equipment 1 creating a binding between the uplink traffic data flow and the Uu radio bearer 5; a one-to-one mapping between the Uu radio bearer 5 and the S1 bearer 6 is implemented by the base station 2 creating a binding between the Uu radio bearer 5 and the S1 bearer 6; and a one-to-one mapping between the S1 bearer 6 and the S5/S8 bearer 7 is implemented by the S-GW creating a binding between the S1 bearer 6 and the S5/S8 bearer 7. Finally, the EPS bearer that transmits the data is cascaded by the Un radio bearer 5, the S1 bearer 6 and the S5/S8 bearer 7 and implements that the user equipment 1 supports a PDN connecting service between external PDN networks, thereby ensuring the QoS of multi-service. The relationships among the Uu radio bearer 5, the S1 bearer 6, and the S5/S8 bearer 7 are one-to-one mapping relationships.

As for the LTE-A network after the relay node RN is introduced, a Un radio bearer (Un RB, Un Radio Bearer) configured to support relay transmission exists on the relay link. The bearer mapping solution of the traffic flow in the existing LTE network cannot implement the transmission of the traffic data flow in the LTE-A network after the relay node RN is introduced, and therefore the QoS of the multi-service cannot be ensured.

SUMMARY OF THE INVENTION

Embodiments of the present invention provide a traffic bearer mapping method and a communication device, so as to implement transmission of a traffic data flow in an LTE-A network after a relay node is introduced, thereby ensuring QoS of multi-service.

The traffic bearer mapping method and the communication device provided in the present invention are implemented as follows:

A traffic bearer mapping method includes:

obtaining attribute information of a traffic data flow of a user; and selecting a relay transmission tunnel according to the attribute information of the traffic data flow of the user, and mapping the received traffic data flow to the relay transmission tunnel for transmission, where the relay transmission tunnel includes a Un RB or a bearer including the Un RB.

A traffic bearer mapping method includes:

de-mapping a received traffic data flow, and restoring the traffic data flow corresponding to a user, where the received traffic data flow is sent by a peer end node through a relay transmission tunnel, and the relay transmission tunnel is selected by the peer end node according to attribute information of the traffic data flow of the user, and includes a relay link radio bearer Un RB or a bearer including the Un RB; and mapping the traffic data flow corresponding to the user to a predetermined bearer for transmission.

A communication device includes:

an obtaining unit, configured to obtain attribute information of a traffic data flow of a user;

a selecting unit, configured to select a relay transmission tunnel according to the attribute information of the traffic data flow of the user; and a first mapping unit, configured to map the received traffic data flow to the relay transmission tunnel for transmission, where the relay transmission tunnel includes a Un RB or a bearer including the Un RB.

A communication device includes:

a de-mapping unit, configured to de-map a received traffic data flow, and restore the traffic data flow corresponding to a user, where the received traffic data flow is sent by a peer end node through a relay transmission tunnel, and the relay transmission tunnel is selected by the peer end node according to attribute information of the traffic data flow of the user, and includes a Un RB or a bearer including the Un RB; and a second mapping unit, configured to map the traffic data flow corresponding to the user to a predetermined bearer for transmission.

In can be seen from the forgoing technical solutions provided in the embodiments of the present invention that, an embodiment of the present invention provides a traffic bearer mapping method in an LTE-A network after an relay node is introduced, so as to implement the transmission of the traffic data flow in the LTE-A network, thereby ensuring the QoS of multi-service.

DETAILED DESCRIPTION OF THE DRAWINGS

To illustrate the technical solutions in the embodiments of the present invention clearer, the accompanying drawings for describing the embodiments or the prior art are introduced briefly in the following. Apparently, the accompanying drawings in the following description are only some embodiments of the present invention, and persons of ordinary skill in the art may further derive other drawings according to the accompanying drawings without creative efforts.

DETAILED DESCRIPTION OF THE EMBODIMENTS

In order to make persons skilled in the art better understand the technical solutions of the present invention, the technical solutions in the present invention are clearly and fully described below with reference to the accompanying drawings. Apparently, the embodiments to be described below are merely a part rather than all of the embodiments of the present invention. All other embodiments obtained by persons of ordinary skill in the art based on the embodiments of the present invention without creative efforts shall fall within protection scope of the present invention.

Figure 1:
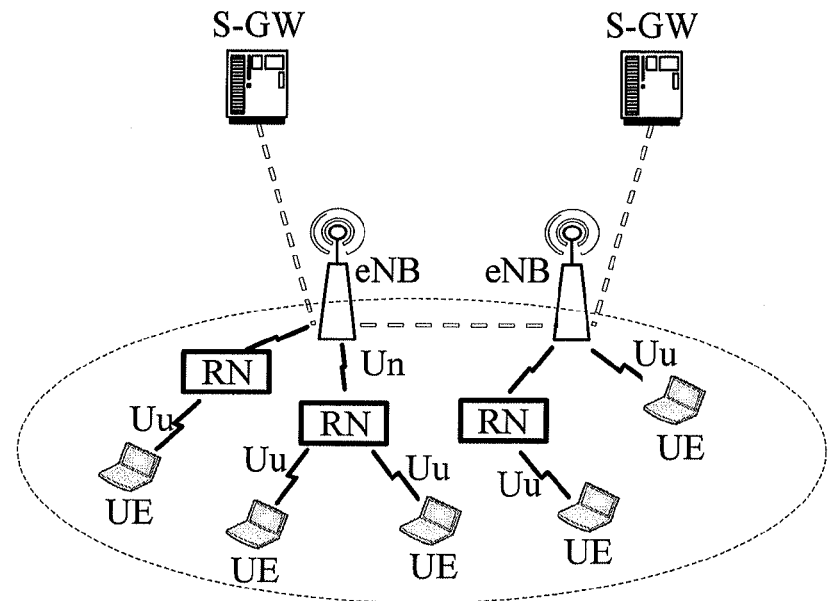
FIG. 1 is a schematic diagram of an LTE-A network in the prior art.
Figure 2:
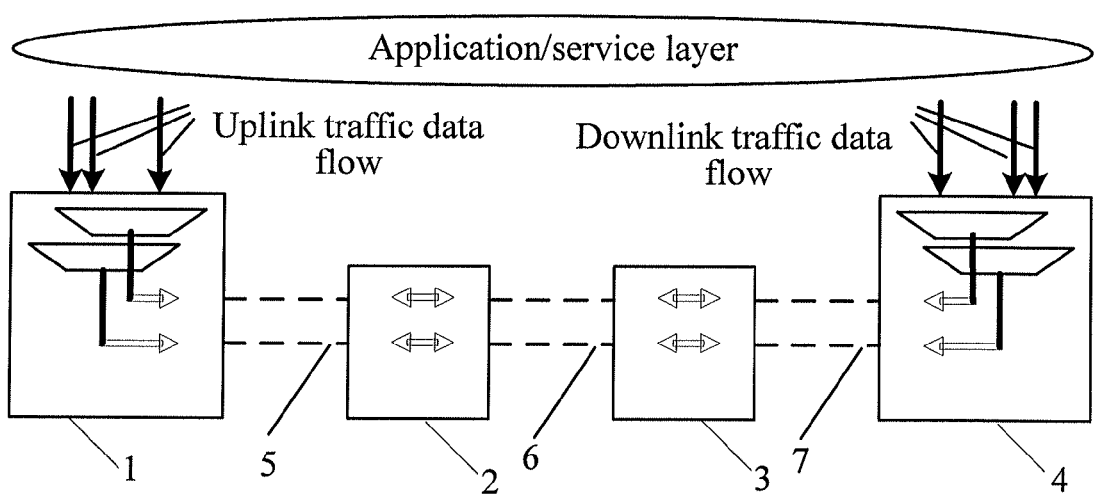
FIG. 2 is a schematic diagram of bearer mapping of a traffic data flow in an LTE network in the prior art.
Figure 3:
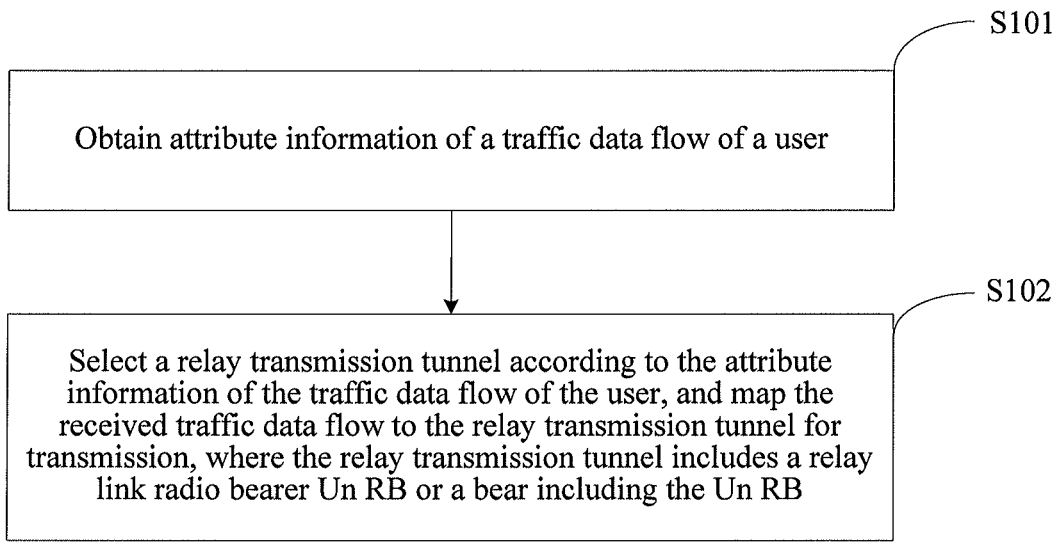
FIG. 3 is a flow chart of a traffic bearer mapping method according to an embodiment of the present invention.

FIG. 3 is a flow chart of a traffic bearer mapping method according to an embodiment of the present invention, which includes the following.

S101: Obtain attribute information of a traffic data flow of a user.

S102: Select a relay transmission tunnel according to the attribute information of the traffic data flow of the user, and map the received traffic data flow to the relay transmission tunnel for transmission, where the relay transmission tunnel includes a relay link radio bearer Un RB or a bearer including the Un RB.

In the bearer mapping method provided in the embodiment of present invention, a main execution body may be a relay node RN, and correspondingly, the traffic data flow is an uplink traffic data flow. In the bearer mapping method provided in the embodiment of the present invention, the main execution body may also be a base station eNB or a packet data network gateway P-GW of the relay node RN, and correspondingly, the traffic data flow is a downlink traffic data flow.

An embodiment of the present invention provides a traffic bearer mapping method in an LTE-A network after a relay node is introduced, so as to implement transmission of the traffic data flow in the LTE-A network, thereby ensuring QoS of multi-service.

Figure 4:
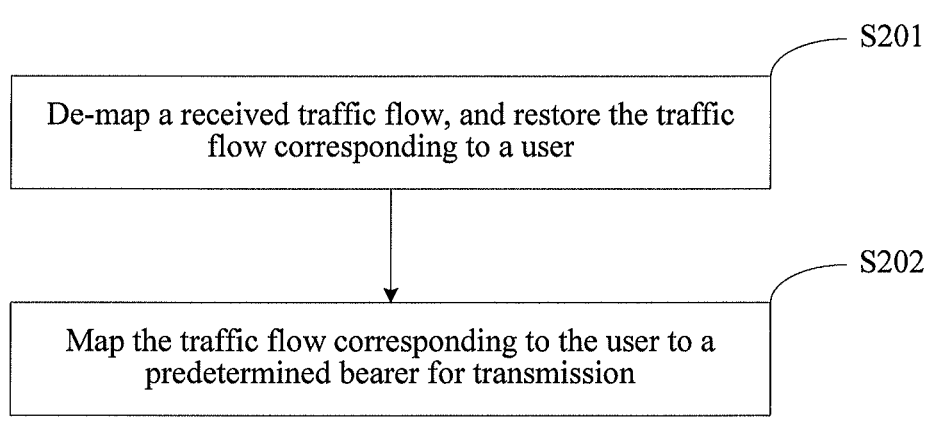
FIG. 4 is a flow chart of another traffic bearer mapping method according to an embodiment of the present invention.

FIG. 4 is a flow chart of another traffic bearer mapping method according to an embodiment of the present invention, which includes the following.

S201: De-map a received traffic data flow, and restore the traffic data flow corresponding to a user.

S202: Map the traffic data flow corresponding to the user to a predetermined bearer for transmission.

In the bearer mapping method provided in this embodiment, a main execution body may be a base station eNB, a serving gateway S-GW, or a packet data network gateway P-GW, and correspondingly, the traffic data flow is an uplink traffic data flow. In the bearer mapping method provided in this embodiment, the main execution body may also be a relay node RN, and correspondingly, the traffic data flow is a downlink traffic data flow.

An embodiment of the present invention provide a traffic bearer mapping method in an LTE-A network after a relay node is introduced, so as to implement transmission of the traffic data flow in the LTE-A network, thereby ensuring QoS of multi-service.

The traffic bearer mapping method provided in the embodiment of the present invention corresponds to a specific protocol stack architecture. The specific protocol stack architecture comprises two types as follows: One is a protocol stack architecture where a backhaul terminates at an eNB, and the other is a protocol stack architecture where the backhaul terminates at an RN. The backhaul refers to an intermediate link from the gateway to the base station. In the LTE-A network, the backhaul refers to an intermediate link from the gateway to the base station or the relay node. In the LTE-A network, the backhaul may specifically be an S1 bearer, where the S1 is an interface identifier between the gateway and the base station or the gateway and the relay node. That is, the specific protocol stack architecture includes a protocol stack architecture where an S1 bearer terminates at an eNB and a protocol stack architecture where an S1 bearer terminates at an RN. The S1 bearer in the following embodiments is the backhaul.

Figure 5:
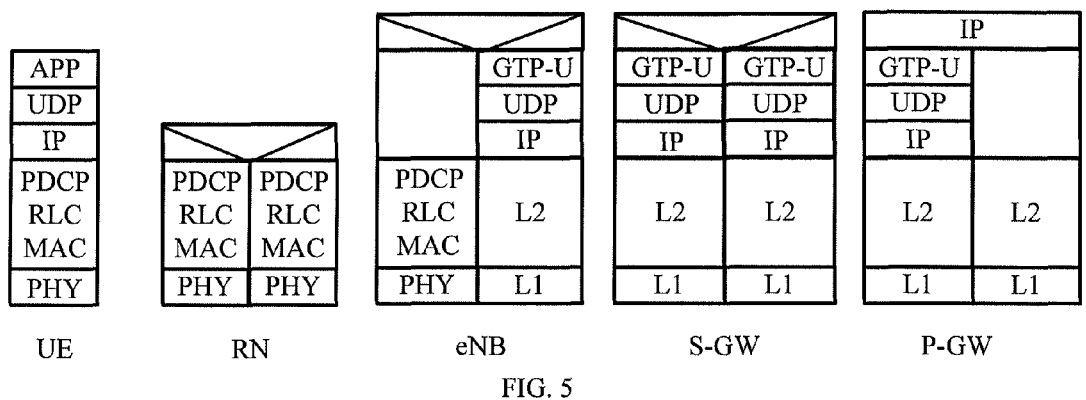
FIG. 5 is a schematic diagram of a protocol stack architecture 1 where an S1 bearer terminates at an eNB according to an embodiment of the present invention.
Figure 6:
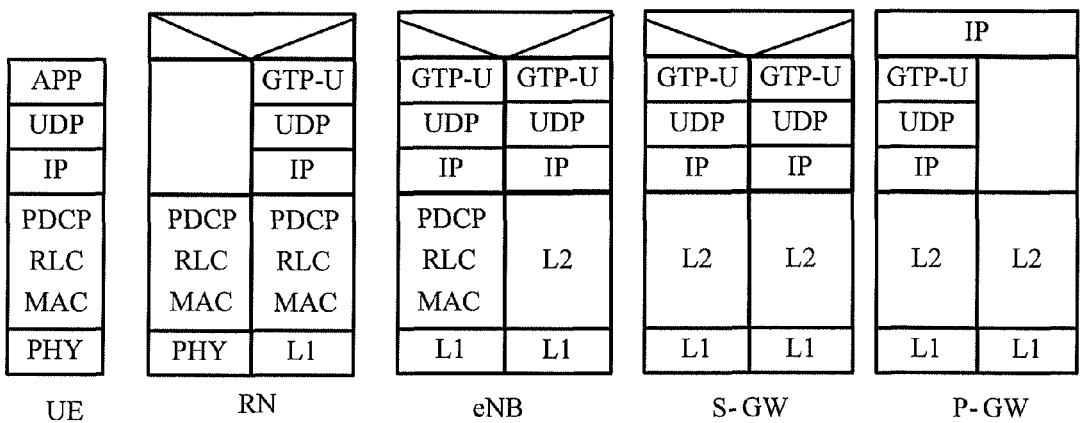
FIG. 6 is a schematic diagram of a protocol stack architecture 2 where an S1 bearer terminates at an eNB according to an embodiment of the present invention.

The protocol stack architecture where the S1 bearer terminates at the eNB includes a protocol stack architecture 1 where an S1 bearer terminates at a n eNB and a protocol stack architecture 2 where an S1 bearer terminates at an eNB, as shown in FIG. 5 and FIG. 6. The difference between FIG. 5 and FIG. 6 lies in that, a GTP-U sub-layer, a UDP sub-layer, and an IP sub-layer are added in a layer 3 (L3) of an RN end and an eNB end of a Un interface in FIG. 6.

Figure 7:
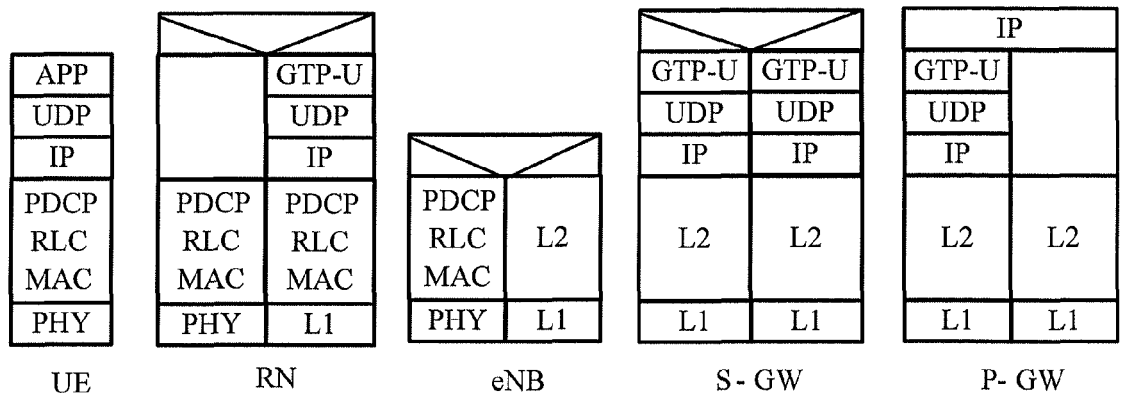
FIG. 7 is a schematic diagram of a protocol stack architecture 1 where an S1 bearer terminates at an RN according to an embodiment of the present invention.
Figure 8:
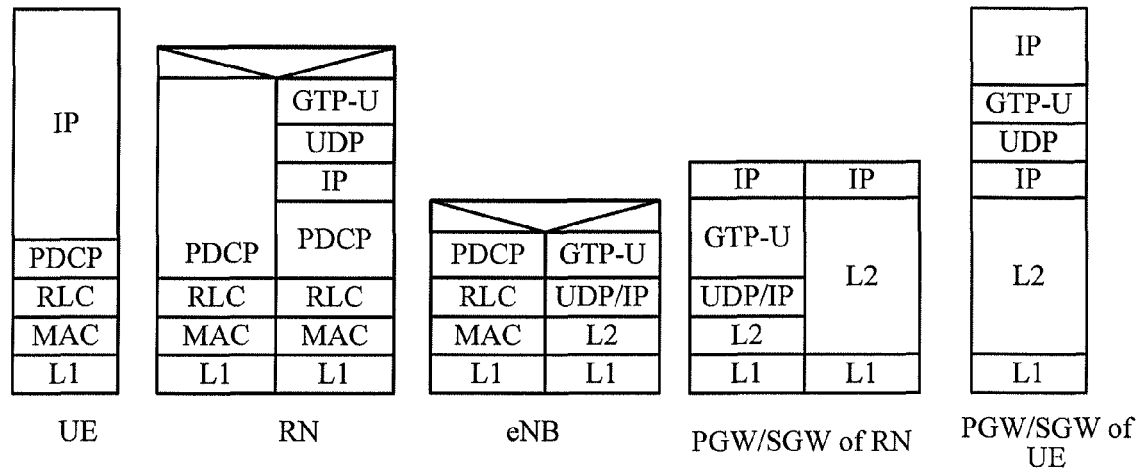
FIG. 8 is a schematic diagram of a protocol stack architecture 2 where an S1 bearer terminates at an RN according to an embodiment of the present invention.

The protocol stack architecture where the S1 bearer terminates at the RN includes a protocol stack architecture 1 where an S1 bearer terminates at an RN and a protocol stack architecture 2 where an S1 bearer terminates at an RN, as shown in FIG. 7 and FIG. 8. In FIG. 7, L3 of a Un interface side of the RN protocol stack includes an IP sub-layer, a UDP sub-layer, and a GTP-U sub-layer, and internal forwarding between the Uu interface and the Un interface is performed above the GTP-U layer. The eNB is responsible for the internal forwarding between the Un interface and the core network side bearer in the IP layer above the core network layer 2 (L2). The structure of the protocol stack in the UE, the S-GW, and the P-GW is known by persons skilled in the art, and are not described in detail here. In FIG. 8, the L3 of the Un interface side of the RN protocol stack includes an IP sub-layer, a UDP sub-layer, and a GTP-U sub-layer, and internal forwarding between the Uu interface and the Un interface is performed above the GTP-U layer. The structure of the protocol stack in the UE, the eNB, the S-GW, and the P-GW is known by persons skilled in the art, and are not described in detail here.

As for the protocol stack architecture 1 where the S1 bearer terminates at the eNB, the S1 bearer transmits the EPS bearer data of the UE between the eNB and the S-GW.

Figure 9:
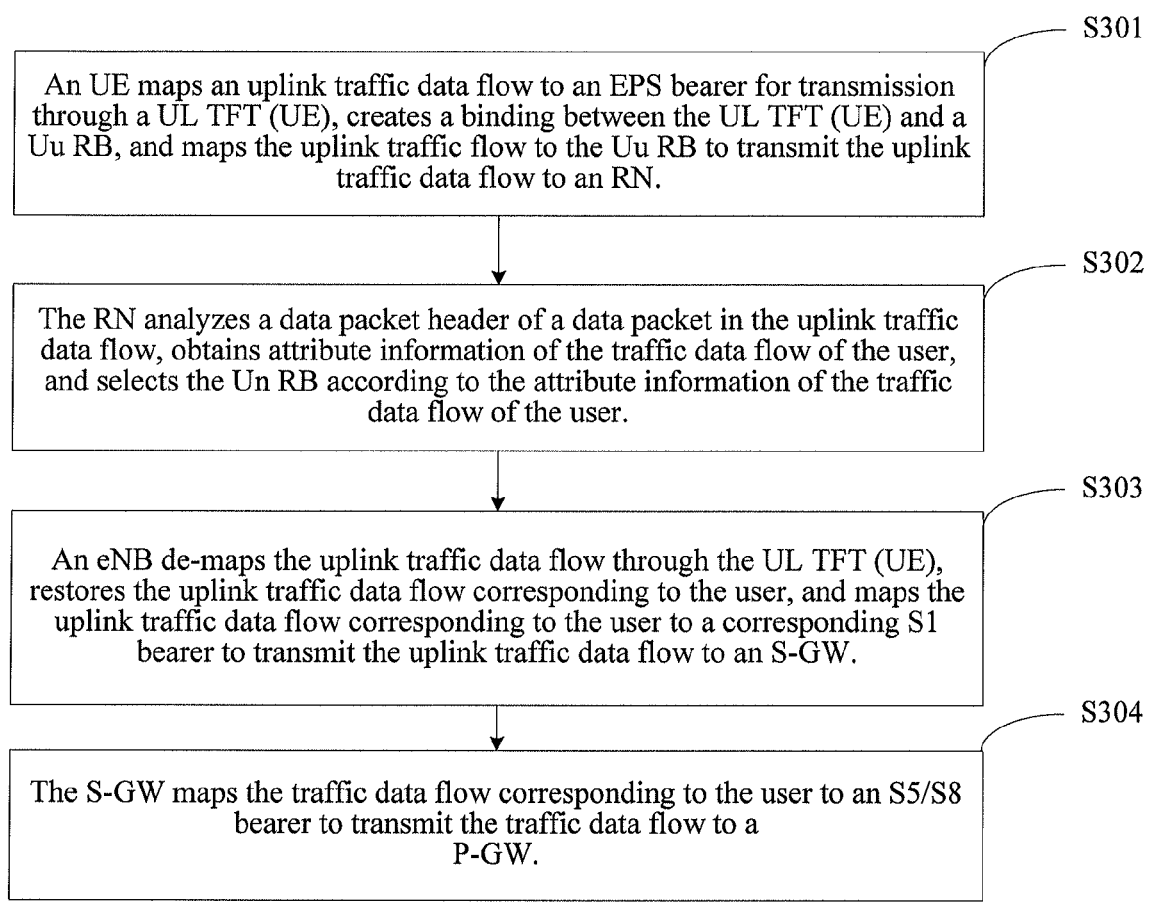
FIG. 9 is a flow chart of an uplink traffic bearer mapping method in the case of a protocol stack architecture 1 where an S1 bearer terminates at an eNB according to an embodiment of the present invention.

FIG. 9 is a flow chart of an uplink traffic bearer mapping method in the case of a protocol stack architecture 1 where an S1 bearer terminates at an eNB according to an embodiment of the present invention, which includes the following.

S301: A UE maps an uplink traffic data flow to an EPS bearer for transmission through a UL TFT (UE), creates a binding between the UL TFT (UE) and a Uu RB, maps the uplink traffic data flow to the Uu RB and transmits the uplink traffic data flow to an RN.

The UE analyzes a Un GTP/IP header of a data packet in the uplink traffic data flow of an IP layer of the UE through the UL TFT (UE), matches an attributes of EPS bearer according to an analysis result, and maps the uplink traffic data flow to a successfully matched EPS bearer for transmission. The relationship between the EPS bearer and the Uu RB is a one-to-one mapping relationship. Each EPS bearer on the Uu interface is mapped to a Uu RB, and therefore the uplink traffic data flow is also correspondingly mapped to a Un RB and is transmitted to the RN.

After creating the binding between the UL TFT (UE) and the Uu RB, the UE records the mapping relationship between the UL TFT (UE) and the Uu RB, thereby creating an uplink mapping between the uplink traffic data flow and the Uu RB.

S302: The RN analyzes a data packet header of the data packet in the uplink traffic data flow through the UL TFT (RN), obtains attribute information of the traffic data flow of the user, and selects a Un RB according to the attribute information of the traffic data flow of the user.

The relationship between the Uu RB and the Un RB is a many-to-one mapping relationship.

The data packet header includes, but is not limited to, a user datagram protocol/Internet protocol header of a user (UE UDP/IP), where the UDP (User Datagram Protocol) is a user datagram protocol.

The attribute information of the traffic data flow of the user includes, but is not limited to, an IP address, a port number, or a service type identifier.

The selecting the Un RB according to the attribute information of the traffic data flow of the user specifically is: matching the attribute information of the traffic data flow of the user with an attribute parameter of the Un RB, and selecting a successfully matched Un RB as the predetermined Un RB, where the attribute parameter of the Un RB includes, but is not limited to, a QoS parameter and/or a Un RB identifier (Un RB ID).

S303: The eNB de-maps the uplink traffic data flow through the UL TFT (UE), restores the uplink traffic data flow corresponding to the user, and maps the uplink traffic data flow corresponding to the user to the corresponding S1 bearer to transmit the uplink traffic data flow to an S-GW.

The de-mapping is a one-to-many de-mapping, and the relationship between the Si bearer and the Un RB is a many-to-one mapping relationship.

After creating the binding between the UL TFT (UE) and the S1 bearer, the eNB records the mapping relationship between the UL TFT (UE) and the S1 bearer, thereby creating an uplink mapping between the Un RB and the S1 bearer.

The creating, by the eNB, the binding between the UL TFT (UE) and the S1 bearer includes the following.

The eNB analyzes the UE UDP/IP header of the data packet in the uplink traffic data flow through the UL TFT (UE), obtains the attribute information of the traffic data flow of the user, selects a matched S1 bearer according to the attribute information of the traffic data flow of the user, and binds the UL TFT (UE) and the matched S1 bearer.

The attribute information of the traffic data flow of the user includes, but is not limited to, an IP address, a port number, and a service type identifier.

S304: The S-GW maps the traffic data flow corresponding to the user to an S5/S8 bearer to transmit the traffic data flow to a P-GW.

The relationship between the S1 bearer and the S5/S8 bearer is a one-to-one mapping relationship.

Figure 10:
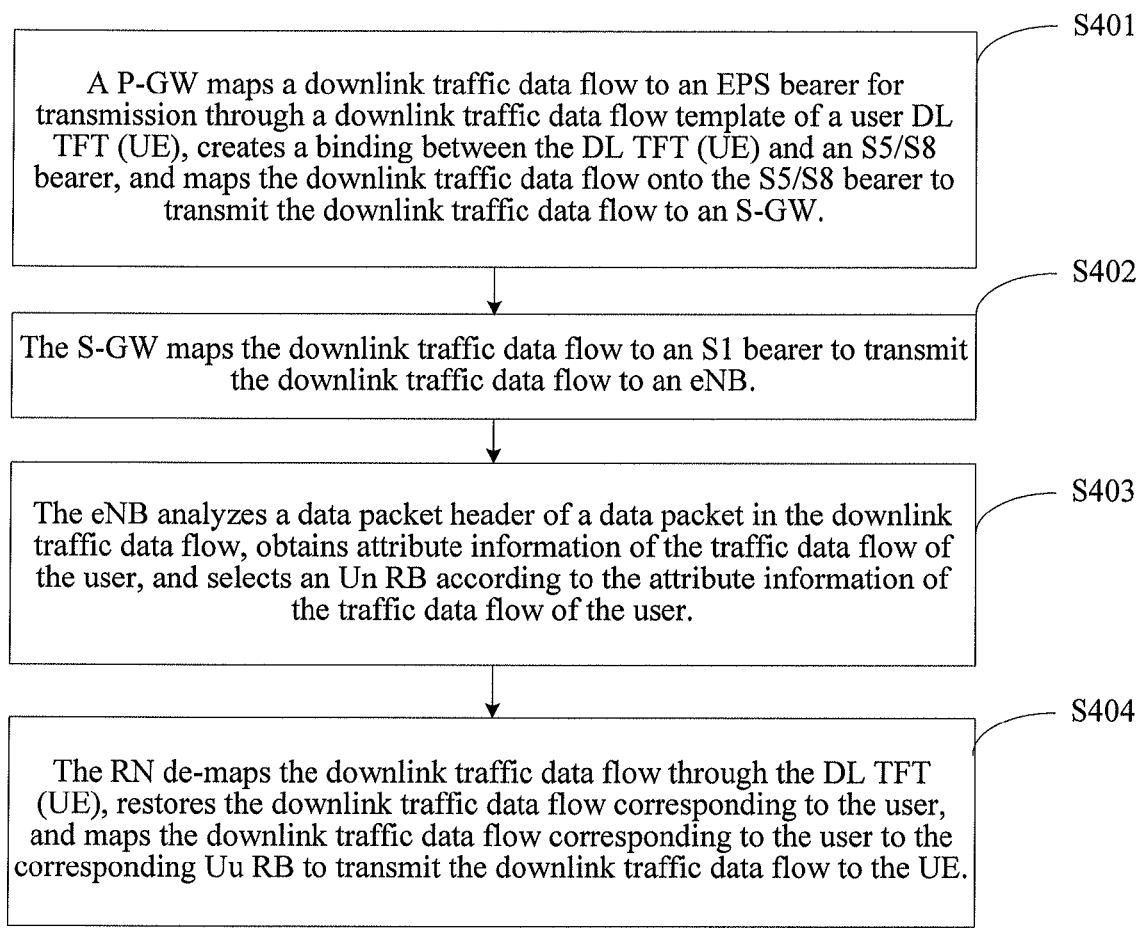
FIG. 10 is a flow chart of a downlink traffic bearer mapping method in the case of a protocol stack architecture 1 where an S1 bearer terminates at an eNB according to an embodiment of the present invention.

FIG. 10 is a flow chart of a downlink traffic bearer mapping method in the case of a protocol stack architecture 1 where an S1 bearer terminates at an eNB according to an embodiment of the present invention, which includes the following.

S401: A P-GW maps a downlink traffic data flow to an EPS bearer for transmission through a downlink traffic flow template of a user DL TFT (UE) (Downlink Traffic Flow Template (UE)), creates a binding between the DL TFT (UE) and an S5/S8 bearer, and maps the downlink traffic data flow to the S5/S8 bearer to transmit the downlink traffic data flow to an S-GW.

The P-GW analyzes a UE UDP/IP header of a data packet in the downlink traffic data flow through the DL TFT (UE), matches the UE UDP/IP header with an attribute of the EPS bearer according to an analysis result, and maps the downlink traffic data flow to a successfully matched EPS bearer for transmission. A relationship between the EPS bearer and the S5/S8 bearer is a one-to-one mapping relationship. Each EPS bearer on the S5/S8 interface is mapped to an S5/S8 bearer, and therefore the downlink traffic data flow is also correspondingly mapped to an S5/S8 bearer and is transmitted to the S-GW.

After creating the binding between the DL TFT (UE) and the S5/S8 bearer, the P-GW records the mapping relationship between the DL TFT (UE) and the S5/S8 bearer, thereby creating a downlink mapping between the downlink traffic data flow and the S5/S8 bearer.

S402: The S-GW maps the downlink traffic data flow to an S1 bearer to transmit the downlink traffic data flow to an eNB.

The relationship between the S1 bearer and the S5/S8 bearer is a one-to-one mapping relationship.

S403: The eNB analyzes a data packet header of the data packet in the downlink traffic data flow through the DL TFT (RN), obtains attribute information of the traffic data flow of the user, and selects a Un RB according to the attribute information of the traffic data flow of the user.

The relationship between the S1 bearer and the Un RB is a many-to-one mapping relationship.

The data packet header includes, but is not limited to, a UE UDP/IP header.

The attribute information of the traffic data flow of the user includes, but is not limited to, an IP address, a port number, and a service type identifier.

The selecting the Un RB according to the attribute information of the traffic data flow of the UE specifically is: matching the attribute information of the traffic data flow of the user with an attribute parameter of the Un RB, and selecting a successfully matched Un RB as the predetermined Un RB, where the attribute parameter of the Un RB includes, but is not limited to, a QoS parameter and/or a Un RB identifier (Un RB ID).

S404: An RN de-maps the downlink traffic data flow through the DL TFT (UE), restores the downlink traffic data flow corresponding to the user, and maps the downlink traffic data flow corresponding to the user to a corresponding Uu RB to transmit the downlink traffic data flow to the UE.

The de-mapping is a one-to-many de-mapping, and the relationship between the Uu RB and the Un RB is a many-to-one mapping relationship.

After creating the binding between the DL TFT (UE) and the Uu RB, the RN records the mapping relationship between the DL TFT (UE) and the Uu RB, thereby creating a downlink mapping between the Un RB and the Uu RB.

The creating, by the RN, the binding between the DL TFT (UE) and the Uu RB includes the following.

The RN analyzes the UE UDP/IP header of the data packet in the downlink traffic data flow through the DL TFT (UE), obtains the attribute information of the traffic data flow of the user, selects a matched Uu RB according to the attribute information of the traffic data flow of the user, and binds the DL TFT (UE) and the matched Uu RB.

The attribute information of the traffic data flow of the user includes, but is not limited to, an IP address, a port number, and a service type identifier.

The bearer binding operation in the uplink/downlink bearer mapping may be implemented in an EPS bearer setup/modifying process of the UE, and an information element IE (Information Element) indication needs to be added in the EPS bearer setup/modifying process of the UE, where the information element IE indication includes, but is not limited to, a bearer binding relationship and identifier mapping information.

In order to enable the eNB and the RN to obtain update information of the UE TFT, the information element IE indication of the UE TFT needs to be added in an existing uplink and downlink information interaction process, so as to notify the eNB and the RN, where the information element IE indication of the UE TFT includes TFT attribute information of the UE.

An entity equipment of the core network (an MME (Mobility Management Entity)/an S-GW/a P-GW) may notify the eNB of the update information of the UE TFT in the downlink information interaction, and then the eNB notifies the RN of the update information of the UE TFT through the Un interface information; or the UE notifies the RN of the update information of the UE TFT in the uplink information interaction, and then the RN delivers the update information of the UE TFT to the eNB and the entity equipment of the core network.

Similarly, in order to enable the eNB to obtain the necessary update information of the RN TFT, the information element IE indication of the RN TFT needs to be added in the existing uplink and downlink information interaction process, so as to notify the eNB the information element IE indication of the RN TFT includes TFT attribute information of the RN.

The entity equipment of the core network may notify the eNB and the RN of the update information of the RN TFT in the downlink information interaction; or the RN notifies the eNB of the update information of the RN TFT, and then the eNB delivers the update information to the entity equipment of the core network.

An embodiment of the present invention provides a traffic bearer mapping method in an LTE-A network after a relay node is introduced, so as to implement the transmission of the traffic data flow in the LTE-A network, thereby ensuring the QoS of multi-service.

Figure 11:
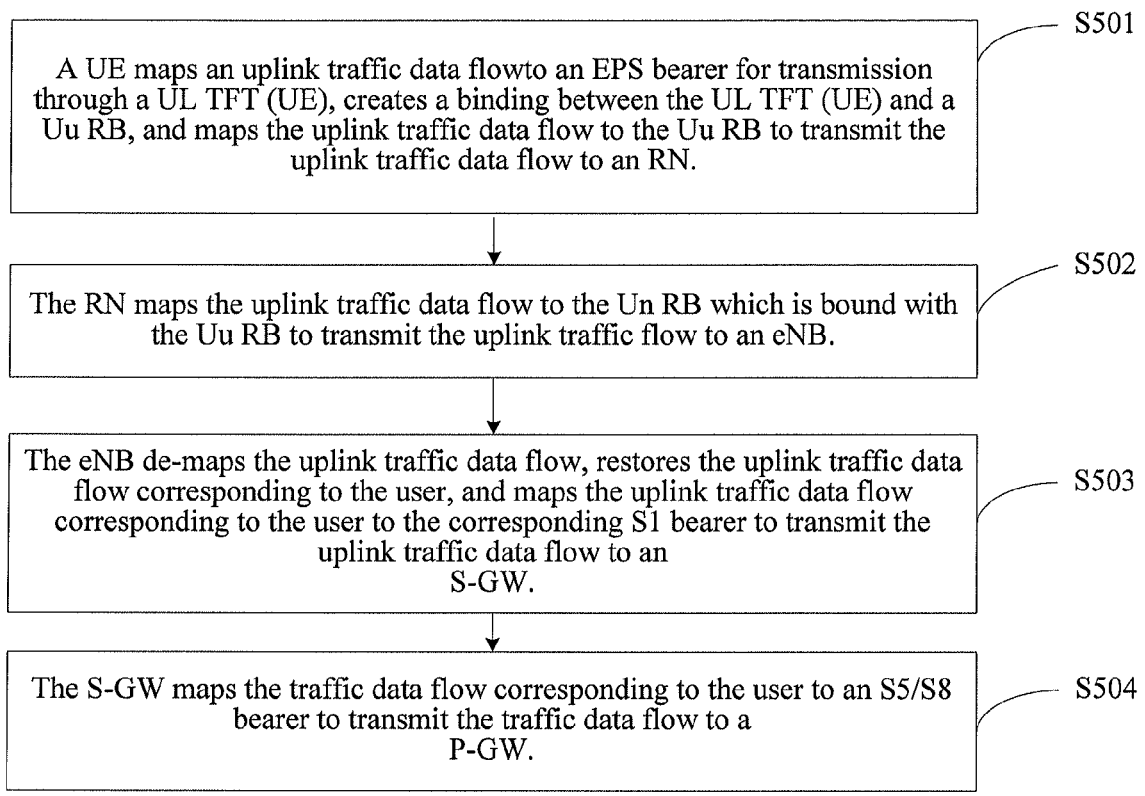
FIG. 11 is a flow chart of an uplink traffic bearer mapping method in the case of a protocol stack architecture 1 where an S1 bearer terminates at an eNB according to an embodiment of the present invention.

FIG. 11 is a flow chart of an uplink traffic bearer mapping method in the case of a protocol stack architecture 1 where an S1 bearer terminates at an eNB according to an embodiment of the present invention, which includes the following.

S501: a UE maps an uplink traffic data flow to an EPS bearer for transmission through a UL TFT (UE), creates a binding between the UL TFT (UE) and a Uu RB, and maps the uplink traffic data flow to the Uu RB to transmit the uplink traffic data flow to an RN.

Step 501 is to the same as step 301, and is not described in detail here.

S502: The RN maps the uplink traffic flow to the Un RB which is bound with the Uu RB to transmit the uplink traffic data flow to an eNB.

The relationship between the Uu RB and the Un RB is a many-to-one mapping relationship.

Before the uplink traffic data flow is transmitted, a core network end and an RN end perform control signaling interaction, where the control signaling includes attribute information of the traffic data flow of the user of the uplink traffic data flow to be transmitted, and the control signaling interaction process includes an EPS bearer setup/modifying process.

One or more Un RBs for bearer mapping exist on the Un, and the RN binds each Uu RB with a specific Un RB according to a relevant criterion (for example, a QoS parameter), which is specifically as follows.

The RN obtains the attribute information of the traffic data flow of the user from the control signaling interaction process, matches the attribute information of the traffic data flow of the user with attribute information of the Un RB according to the attribute information of the traffic data flow of the user, and performs bearer binding between a successfully matched Un RB and the Uu RB transmitting the uplink traffic data flow.

The attribute information of the traffic data flow of the user includes, but is not limited to, a QoS parameter and/or a Uu RB ID, and the attribute information of the Un RB includes, but is not limited to, a QoS parameter and/or a Un RB ID.

In the embodiment of the present invention, the bearer binding between the Uu RB and the Un RB directly performs association by utilizing respective identifiers of the two bearers, and the association is a unidirectional association. For example, supposing a bearer binding between A and B is performed, the data transmitted from a bearer A is directly delivered to a bearer B for transmission; and on the contrary, the data transmitted from the bearer B cannot be directly delivered to the bearer A for transmission.

When the bearer binding between the Uu RB and the specific Un RB is performed, the uplink data transmitted from the Uu RB is directly delivered to the Un RB for transmission.

S503: The eNB de-maps the uplink traffic data flow through the UL TFT (UE), restores the uplink traffic data flow corresponding to the user, and maps the uplink traffic data flow corresponding to the user to an S1 bearer to transmit the uplink traffic data flow to an S-GW.

Step 503 is the same as step 303, and is not described in detail here.

S504: The S-GW maps the traffic data flow corresponding to the user to an S5/S8 bearer to transmit the traffic data flow to a P-GW.

The relationship between the S1 bearer and the S5/S8 bearer is a one-to-one mapping relationship.

Figure 12:
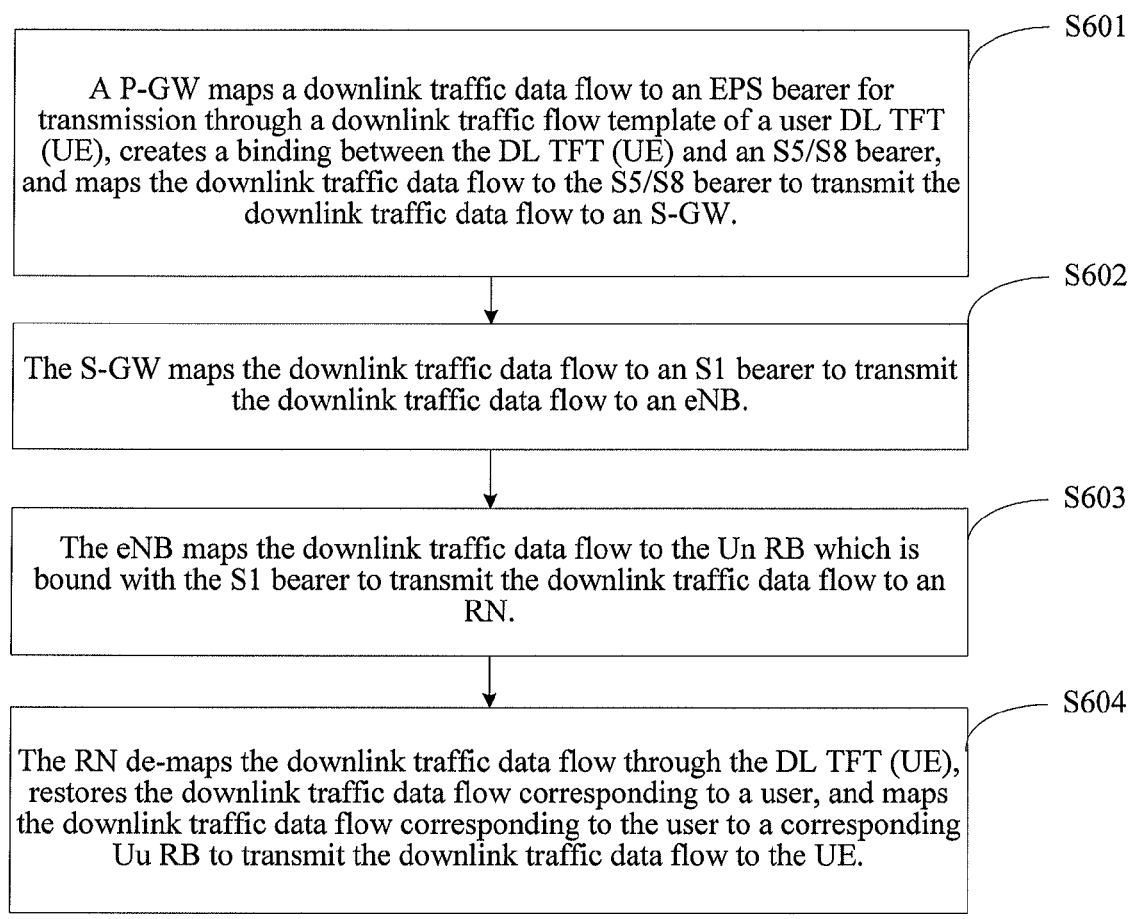
FIG. 12 is a flow chart of a downlink traffic bearer mapping method in the case of a protocol stack architecture 1 where an S1 bearer terminates at an eNB according to an embodiment of the present invention.

FIG. 12 is a flow chart of a downlink traffic bearer mapping method in the case of a protocol stack architecture 1 where an S1 bearer terminates at an eNB according to an embodiment of the present invention, which includes the following.

S601: A P-GW maps a downlink traffic data flow to an EPS bearer for transmission through a downlink traffic flow template of a user DL TFT (UE), creates a binding between the DL TFT (UE) and an S5/S8 bearer, and maps the downlink traffic data flow to the S5/S8 bearer to transmit the downlink traffic data flow to an S-GW.

Step 601 is the same as step 401, and is not described in detail here.

S602: The S-GW maps the downlink traffic flow to an S1 bearer to transmit the downlink traffic data flow to an eNB.

The relationship between the S1 bearer and the S5/S8 bearer is a one-to-one mapping relationship.

S603: The eNB maps the downlink traffic data flow to the Un RB which is bound with the S1 bearer to transmit the downlink traffic data flow to an RN.

The relationship between the S1 bearer and the Un RB is a many-to-one mapping relationship.

Before the uplink traffic data flow is transmitted, a core network end and an eNB end perform control signaling interaction, where the control signaling includes attribute information of the traffic data flow of the user of the uplink traffic data flow to be transmitted, and the control signaling interaction process includes an EPS bearer setup/modifying process.

One or more Un RBs for bearer mapping exist on the Un, and the eNB binds each S1 bearer with a specific Un RB according to a relevant criterion (for example, a QoS parameter), which is specifically as follows.

The eNB obtains the attribute information of the traffic data flow of the user from the control signaling interaction process, matches the attribute information of the traffic data flow of the user with attribute information of the Un RB according to the attribute information of the traffic data flow of the user, and performs bearer binding between a successfully matched Un RB and the S1 bearer transmitting the downlink traffic data flow.

The attribute information of the traffic data flow of the user includes a QoS parameter and/or an S1 TEID, and the attribute information of the Un RB includes a QoS parameter and/or a Un RB ID.

In the embodiment of the present invention, the essence of the bearer binding of the S1 bearer and the Un RB and the bearer binding of the Uu RB and the Un RB is the same, and is not described here.

S604: The RN de-maps the downlink traffic data flow through the DL TFT (UE), restores the downlink traffic data flow corresponding to the user, and maps the downlink traffic data flow corresponding to the user to the S1 bearer to transmit the downlink traffic data flow to the UE.

Step 604 is the same as step 404, and is not described in detail here.

The bearer binding operation in the uplink/downlink bearer mapping may be implemented in an EPS bearer setup/modifying process of the UE, and an information element IE indication needs to be added in the EPS bearer setup/modifying process of the UE, where the information element IE indication includes, but is not limited to, a bearer binding relationship and identifier mapping information.

In order to enable the eNB and the RN to obtain the update information of the UE TFT, the information element IE indication of the UE TFT needs to be added in an existing uplink and downlink information interaction process, so as to notify the eNB and the RN, where the information element IE indication of the UE TFT includes attribute information of the UE TFT.

An entity equipment of the core network (an MME (Mobility Management Entity)/an S-GW/a P-GW) may notify the eNB of the update information of the UE TFT in the downlink information interaction, and then the eNB notifies the RN of the update information of the UE TFT through the Un interface information; or the UE notifies the RN of the update information of the UE TFT in the uplink information interaction, and then the RN delivers the update information of the UE TFT to the eNB and the entity equipment of the core network.

Similarly, in order to enable the eNB to obtain the necessary update information of the RN TFT, the information element IE indication of the RN TFT needs to be added in the existing uplink and downlink information interaction process, so as to notify the eNB, where the IE indication of the RN TFT includes attribute information of the RN TFT.

The entity equipment of the core network may notify the eNB and the RN of the update information of the RN TFT in the downlink information interaction; or the RN notifies the eNB of the update information of the RN TFT, and then the eNB delivers the update information to the entity equipment of the core network.

An embodiment of the present invention provides a traffic bearer mapping method in an LTE-A network after a relay node is introduced, so as to implement the transmission of the traffic data flow in the LTE-A network, thereby ensuring the QoS of multi-service.

As for the protocol stack architecture 1 where an S1 bearer terminates at an eNB, the S1 bearer transmits the EPS bearer data of the UE between the eNB and the S-GW.

Figure 13:
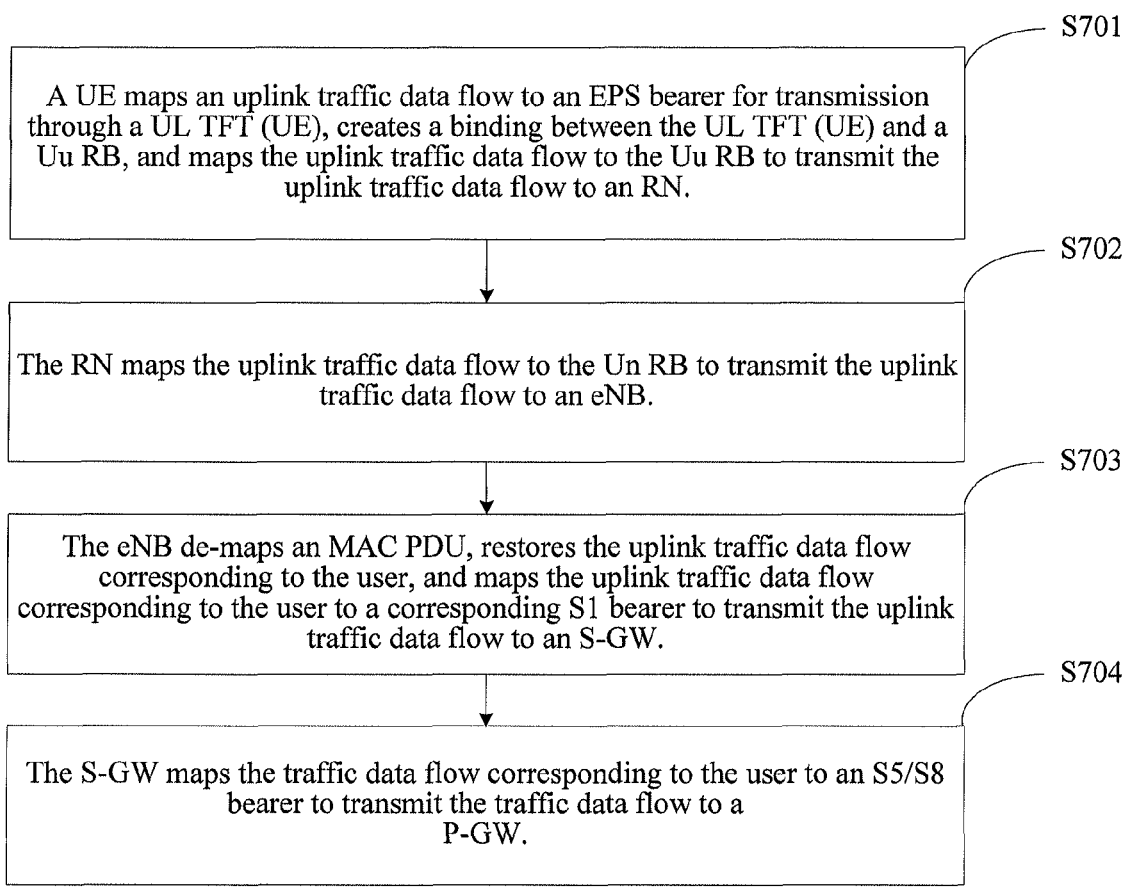
FIG. 13 is a flow chart of an uplink traffic bearer mapping method in the case of a protocol stack architecture 1 where an S1 bearer terminates at an eNB according to an embodiment of the present invention.

FIG. 13 is a flow chart of an uplink traffic bearer mapping method in the case of a protocol stack architecture 1 where an S1 bearer terminates at an eNB according to an embodiment of the present invention, which includes the following.

S701: A UE maps a uplink traffic data flow to an EPS bearer for transmission through an UL TFT (UE), creates a binding between the UL TFT (UE) and a Uu RB, and maps the uplink traffic data flow to the Uu RB to transmit the uplink traffic data flow to an RN.

Step 701 is the same as step 301, and is not described in detail here.

S702: The RN maps the uplink traffic data flow to a Un RB to transmit the uplink traffic data flow to an eNB.

Before the uplink traffic flow data is transmitted, the RN obtains attribute information of the traffic data flow of the user from a control signaling interaction process, where the control signaling interaction process includes an EPS bearer setup/modifying process.

The RN receives the uplink traffic data flow on the Uu interface, obtains an MAC protocol data unit PDU (Protocol Data Unit) after multiplexing a data packet in the uplink traffic data flow at a media access control (MAC, Media Access Control) layer, and maps the MAC PDU to a predetermined Un physical channel. The Un physical channel is a transmission entity of the Un RB at a physical layer, and the uplink traffic data flow may include traffic data flows of different UEs.

The MAC PDU includes a predetermined identifier, and the predetermined identifier may uniquely determine which UE a payload part in the data packet belongs to and an EPS bearer corresponding to the UE.

The predetermined identifier may be newly added with a UE ID on the basis of an existing logical channel identifier, and the range of the existing logical channel identifier may be extended, so that the predetermined identifier may uniquely correspond to a certain EPS bearer of a certain UE, or may indicate the UE and a new identifier of the EPS bearer corresponding to the UE.

Figure 14:
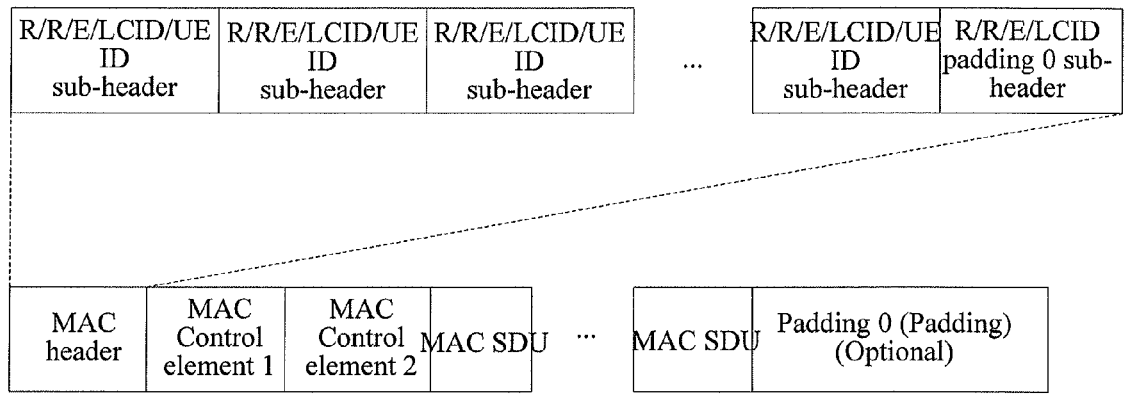
FIG. 14 is a schematic diagram of a format of a multiplexed data packet at an MAC layer according to an embodiment of the present invention.

FIG. 14 is a schematic diagram of a format of a multiplexed data packet at an MAC layer according to an embodiment of the present invention. As shown in FIG. 14, an MAC header includes a plurality of MAC sub-headers, and each MAC sub-header correspondingly describes each data block of an MAC payload region. A first MAC sub-header corresponds to an MAC control element 1, where the MAC control element has the same function with an MAC service data unit SDU (Service Data Unit), and also represents a data block. An LCID (Logical Channel ID) in the MAC sub-header is a logical channel identifier. L (length) is a length indication field, and represents the length of the data block corresponding to the MAC payload region. F (Format) is a format indication field and is configured to indicate a bit number (7 bits or 15 bits) which describes the length of the data block. E (Extension) is an extension field and is configured to indicate whether a part of an MAC header ends. R (Reserved) is a reserved bit, and is set to zero in the LTE.

The selecting the predetermined Un physical channel specifically is: matching the attribute information of the traffic data flow of the user with the predetermined mapping relationship of the Un physical channel, and selecting a successfully matched Un physical channel as the predetermined Un physical channel.

The attribute information of the traffic data flow of the user includes, but is not limited to, a QoS parameter of the traffic flow of the user and/or a type of the logical channel transmitting the traffic data flow of the user. The predetermined mapping relationship includes, but is not limited to, a mapping criterion between the logical channel and the physical channel defined in the LTE or LTE-A specification.

S703: The eNB de-maps the MAC PDU, restores the uplink traffic data flow corresponding to the user, and maps the uplink traffic data flow corresponding to the user to an S1 bearer to transmit the uplink traffic data flow to an S-GW.

The eNB de-multiplexes the data in the MAC PDU to restore the uplink traffic data flow corresponding to the user according to the logical channel mapping relationship and the UE ID information in the MAC PDU, where the uplink traffic data flow corresponding to the user corresponds to different UE EPS bearers, and maps the UL traffic data flow corresponding to the user to the S1 bearer for transmission according to the one-to-one corresponding relationship between the UE EPS bearer and the S1 bearer.

S704: The S-GW maps the traffic data flow corresponding to the user to an S5/S8 bearer to transmit the traffic data flow to a P-GW.

The relationship between the S1 bearer and the S5/S8 bearer is a one-to-one mapping relationship.

Figure 15:
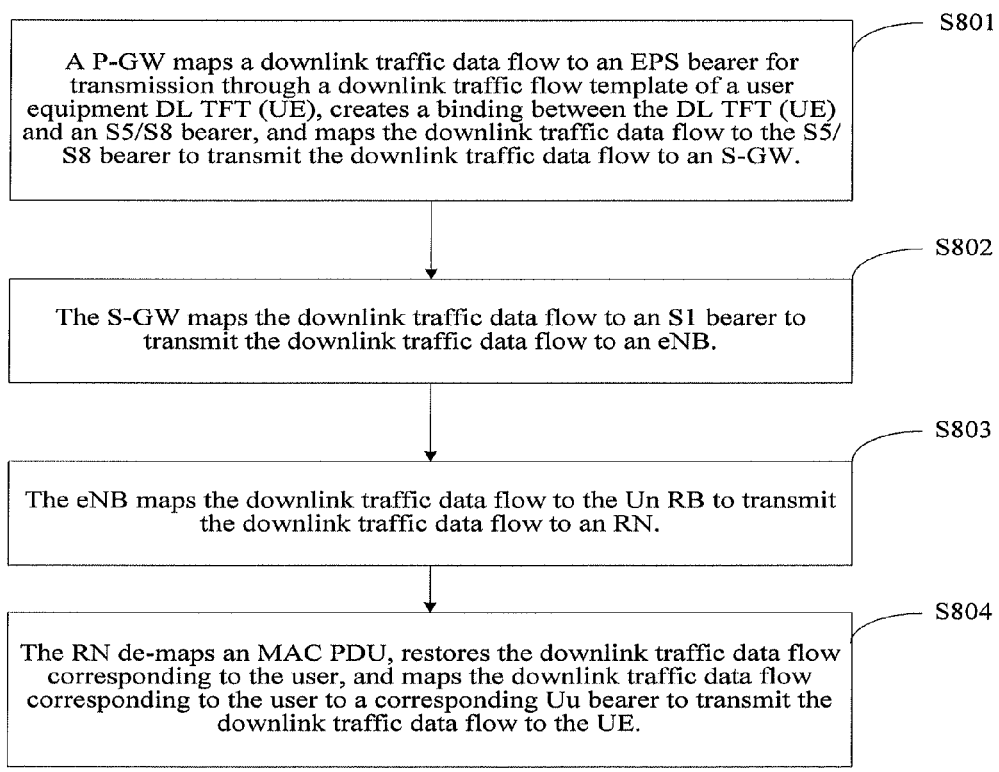
FIG. 15 is a flow chart of a downlink traffic bearer mapping method in the case of a protocol stack architecture 1 where an S1 bearer terminates at an eNB according to an embodiment of the present invention.

FIG. 15 is a flow chart of a downlink traffic bearer mapping method in the case of a protocol stack architecture 1 where an S1 bearer terminates at an eNB according to an embodiment of the present invention, which includes the following.

S801: A P-GW maps a downlink traffic flow to an EPS bearer for transmission through a downlink traffic data flow of a user DL TFT (UE), creates a binding between the DL TFT (UE) and an S5/S8 bearer, and maps the downlink traffic data flow to the S5/S8 bearer to transmit the downlink traffic data flow to an S-GW.

Step 801 is the same as step 401, and is not described in detail here.

S802: The S-GW maps the downlink traffic data flow to an S1 bearer to transmit the downlink traffic data flow to an eNB.

The relationship between the S1 bearer and the S5/S8 bearer is a one-to-one mapping relationship.

S803: The eNB maps the downlink traffic data flow to a Un RB to transmit the downlink traffic data flow to an RN.

The eNB obtains an MAC PDU after multiplexing the data packet in the downlink traffic data flow at the MAC layer according to the attribute information of the traffic data flow of the user, and maps the MAC PDU to a predetermined Un physical (PHY) channel. The Un physical channel is a transmission entity of the Un RB at a physical layer, and the downlink traffic data flow may include traffic data flows of different UEs.

The MAC PDU includes a predetermined identifier, and the predetermined identifier may uniquely determine which UE the payload part in the data packet belongs to and an EPS bearer corresponding to the UE.

The predetermined identifier may be newly added with a UE ID on the basis of an existing logical channel identifier, and the range of the existing logical channel identifier is extended, so that the predetermined identifier may uniquely correspond to a certain EPS bearer of a certain UE, or indicates the UE and a new identifier of the EPS bearer corresponding to the UE.

The selecting the predetermined Un physical channel specifically is: matching the attribute information of the traffic data flow of the user with the predetermined mapping relationship of the Un physical channel, and selecting a successfully matched Un physical channel as the predetermined Un physical channel.

The attribute information of the traffic data flow of the user includes, but is not limited to, a QoS parameter of the traffic flow of the user and/or the type of the logical channel transmitting the traffic data flow of the user. The predetermined mapping relationship includes, but is not limited to, a mapping criterion between the logical channel and the physical channel defined in the LTE or LTE-A specification.

S804: The RN de-maps the MAC PDU, restores the downlink traffic data flow corresponding to the user, and maps the downlink traffic data flow corresponding to the user to a Uu bearer to transmit the downlink traffic data flow to the user.

The RN de-multiplexes the data in the MAC PDU and restores the downlink traffic data flow corresponding to the user according to the logical channel mapping relationship and the UE ID information in the MAC PDU, where the downlink traffic data flow corresponding to the user corresponds to different UE EPS bearers, and maps the downlink traffic data flow corresponding to the user to the Uu bearer for transmission according to the one-to-one corresponding relationship between the UE EPS bearer and the Uu bearer.

An embodiment of the present invention provides a traffic bearer mapping method in an LTE-A network after a relay node is introduced, so as to implement the transmission of a traffic data flow in the LTE-A network, thereby ensuring the QoS of multi-service.

As for the protocol stack architecture 2 where an S1 bearer terminates at an eNB, the S1 bearer is used to transmit the EPS bearer data of the UE between the eNB and the S-GW.

In the embodiment of the present invention, a Un GTP tunnel is set up above the Un RB. The Un GTP tunnel connects GTP-U sub-layers of two ends of the Un interface, where the relationships among the Uu RB, the Un GTP tunnel, the S1 bearer, and the S5/S8 bearer are one-to-one mapping relationships, and during the radio transmission through the Un interface, the relationship between the Un GTP and the Un RB is a many-to-one mapping relationship.

Figure 16:
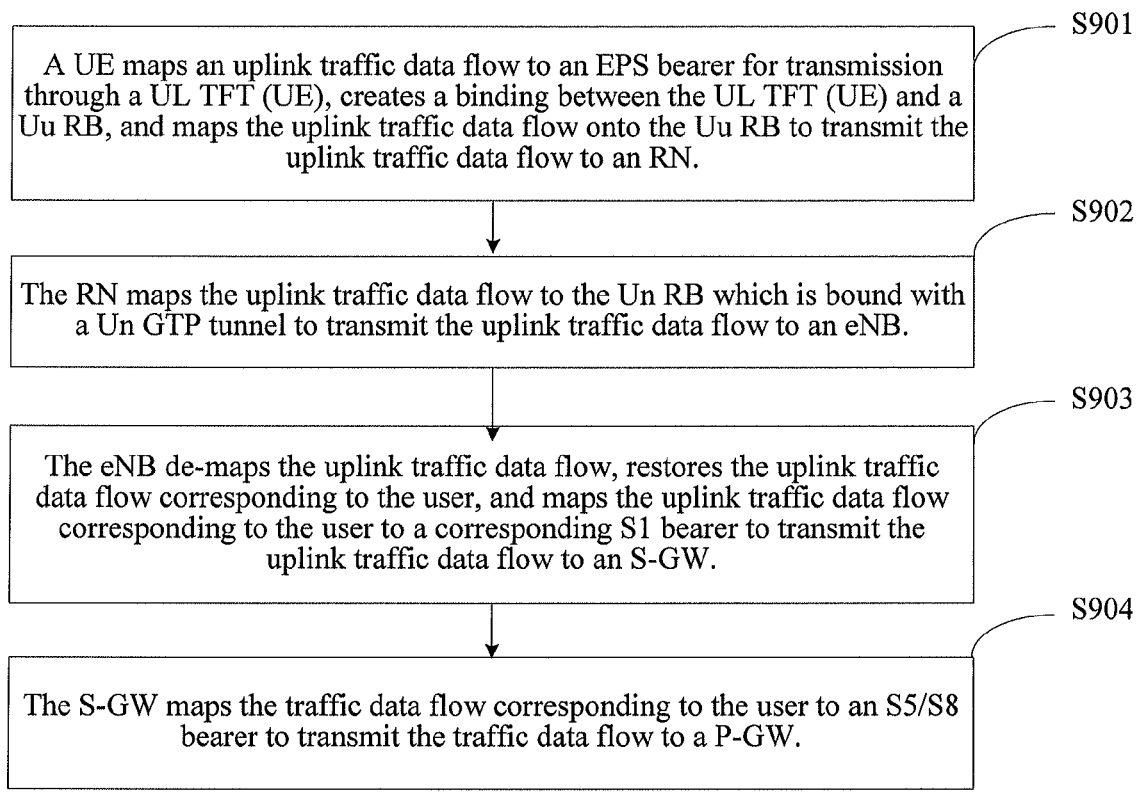
FIG. 16 is a flow chart of an uplink traffic bearer mapping method in the case of a protocol stack architecture 2 where an S1 bearer terminates at an eNB according to an embodiment of the present invention.

FIG. 16 is a flow chart of an uplink traffic bearer mapping method in the case of a protocol stack architecture 2 where an S1 bearer terminates at an eNB according to an embodiment of the present invention, which includes the following.

S901: A UE maps an uplink traffic data flow to an EPS bearer for transmission through a UL TFT (UE), creates a binding between the UL TFT (UE) and a Uu RB, and maps the uplink traffic data flow to the Uu RB to transmit the uplink traffic data flow to an RN.

Step 901 is the same as step 301, and is not described in detail here.

S902: The RN maps the uplink traffic data flow to the Un RB which is bound with the Un GTP tunnel to transmit the uplink traffic data flow to an eNB.

After receiving the uplink traffic data flow, the RN analyzes a data header of a data packet in the uplink traffic data flow at an IP layer, obtains attribute information of the traffic data flow of the user from the data packet. The data header includes a Un GPRS tunneling protocol (Un GTP, Un GPRS Tunneling Protocol) header, and the attribute information of the traffic data flow of the user includes a Un tunnel endpoint identifier (TEID, Tunnel Endpoint IDentifier).

Match the Un TEID with an attribute parameter of the Un RB according to a predetermined criterion, and bind a successfully matched Un TEID with the attribute parameter of the Un RB, thereby implementing the bearer binding between the Un GTP tunnel and the Un RB. The attribute parameter of the Un RB includes a QoS parameter and/or a Un RB ID.

The predetermined criterion includes, but is not limited to, a QoS requirement.

The bearer binding operation between the Un GTP tunnel and the Un RB on the Un may be implemented in an EPS bearer setup/modifying process of the UE.

S903: The eNB de-maps the uplink traffic data flow, restores the uplink traffic data flow corresponding to the user, and maps the uplink traffic data flow corresponding to the user to an Si bearer to transmit the uplink traffic data flow to an S-GW.

Step 903 is the same as step 303, and is not described in detail here.

S904: The S-GW maps the traffic data flow corresponding to the user to an S5/S8 bearer to transmit the traffic data flow to a P-GW.

Figure 17:
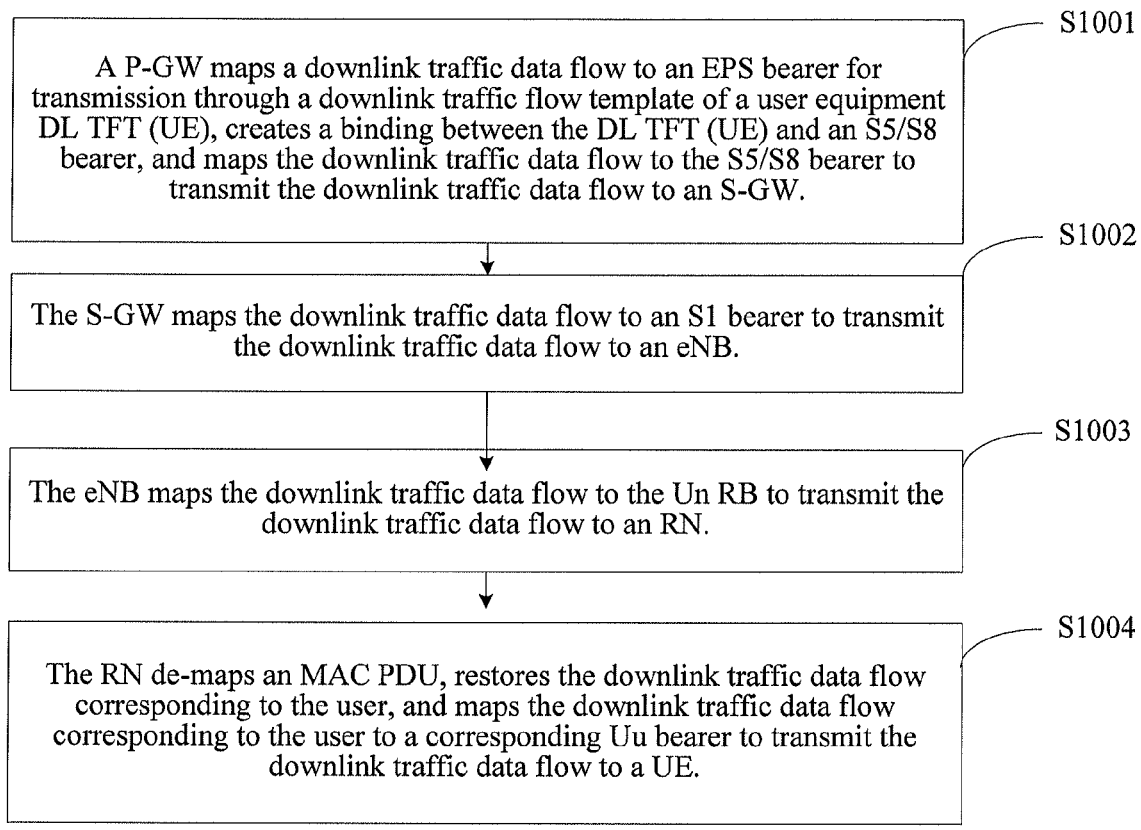
FIG. 17 is a flow chart of a downlink traffic bearer mapping method in the case of a protocol stack architecture 2 where an S1 bearer terminates at an eNB according to an embodiment of the present invention.

FIG. 17 is a flow chart of a downlink traffic bearer mapping method in the case of a protocol stack architecture 2 where an S1 bearer terminates at an eNB according to an embodiment of the present invention, which includes the following.

S1001: A P-GW maps a downlink traffic flow to an EPS bearer for transmission through a downlink traffic flow template of a user DL TFT (UE), creates a binding between the DL TFT (UE) and an S5/S8 bearer, and maps the downlink traffic data flow to the S5/S8 bearer to transmit the downlink traffic data flow to an S-GW.

Step 1001 is the same as step 401, and is not described in detail here.

S1002: The S-GW maps the downlink traffic data flow to an S1 bearer to transmit the downlink traffic data flow to an eNB.

S1003: The eNB maps the downlink traffic data flow to the Un RB which is bound with the Uu GTP tunnel to transmit the downlink traffic data flow to an RN.

After receiving the downlink traffic data flow, the eNB analyzes a data header of a data packet in the downlink traffic data flow at an IP layer, obtains attribute information of the traffic data flow of the user in the data packet. The data header includes a Un GTP header, and the attribute information of the traffic data flow of the user includes a Un TEID.

Match the Un TEID with an attribute parameter of the Un RB according to a predetermined criterion, and bind a successfully matched Un TEID with the attribute parameter of the Un RB, thereby implementing the bearer binding between the Un GTP tunnel and the Un RB. The attribute parameter of the Un RB includes a QoS parameter and/or a Un RB ID.

The predetermined criterion includes, but is not limited to, a QoS requirement.

The bearer binding operation between the Un GTP tunnel and the Un RB on the Un may be implemented in an EPS bearer setup/modifying process of the UE.

S1004: The RN de-maps the downlink traffic data flow, restores the downlink traffic data flow corresponding to the user, and maps the downlink traffic data flow corresponding to the user to a corresponding Uu RB to transmit the downlink traffic data flow to the user.

Step 1004 is the same as step 404, and is not described in detail here.

An embodiment of the present invention provides a traffic bearer mapping method in an LTE-A network after a relay node is introduced, so as to implement the transmission of the traffic data flow in the LTE-A network, thereby ensuring the QoS of multi-service.

Figure 18:
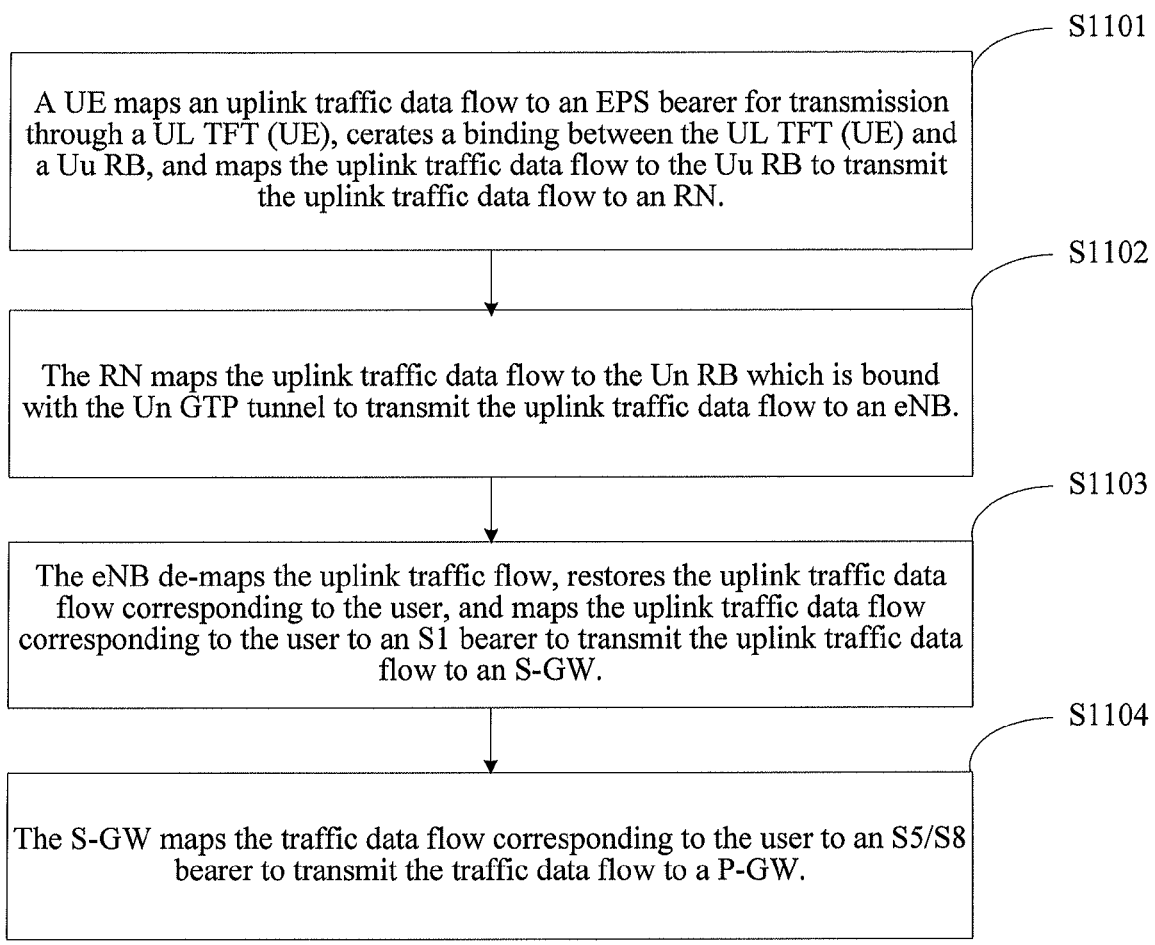
FIG. 18 is a flow chart of an uplink traffic bearer mapping method in the case of a protocol stack architecture 2 where an S1 bearer terminates at an eNB according to an embodiment of the present invention.

FIG. 18 is a flow chart of an uplink traffic bearer mapping method in the case of a protocol stack architecture 2 in which an S1 bearer terminates at an eNB according to an embodiment of the present invention, in which the method includes the following steps.

S1101, a UE maps a UL traffic data flow to an EPS bearer for transmission through a UL TFT (UE), creates a binding between the UL TFT (UE) and a Uu RB, and maps the UL traffic data flow to the Uu RB to transmit the UL traffic data flow to an RN.

Step 1101 is the same as step 301, and is not described in detail here.

S1102: The RN maps the uplink traffic data flow to the Un RB which is bound with the Un GTP tunnel to transmit the uplink traffic data flow to an eNB.

After receiving the uplink traffic data flow, the RN analyzes a data header of a data packet in the UL traffic data flow at an IP layer, obtains attribute information of the traffic data flow of the user in the data packet. The data header includes a Un datagram protocol/Internet protocol header of a user (Un UDP/IP), and the attribute information of the traffic data flow of the user includes predetermined information in the Un UDP/IP header.

If the RN fails to analyze the Un GTP header at the IP layer, for example, the RN fails to analyze the Un GTP header at the IP layer when IPsec encrypted protection is performed on the data packet of the uplink traffic data flow, the RN is required to analyze the Un UDP/IP header at the IP layer.

Match the predetermined information in the Un UDP/IP header with an attribute parameter of the Un RB according to a predetermined criterion, and deliver a successfully matched data packet to the corresponding Un RB for transmission, thereby implementing the bearer binding between the Un GTP tunnel and the Un RB. The attribute parameter of the Un RB includes a QoS parameter and/or a Un RB ID.

The predetermined criterion includes, but is not limited to, a QoS requirement.

The predetermined information in the Un UDP/IP header includes, but is not limited to, an IP address, a port number, and service type indicating information.

The bearer binding operation between the Un GTP tunnel and the Un RB on the Un may be implemented in an EPS bearer setup/modifying process of the UE.

S1103: The eNB de-maps the uplink traffic data flow, restores the uplink traffic data flow corresponding to the user, and maps the uplink traffic data flow corresponding to the user to an S1 bearer to transmit the uplink traffic data flow to an S-GW.

Step 1103 is the same as step 303, and is not described in detail here.

S1104: The S-GW maps the traffic data flow corresponding to the user to an S5/S8 bearer to transmit the traffic data flow to a P-GW.

Figure 19:
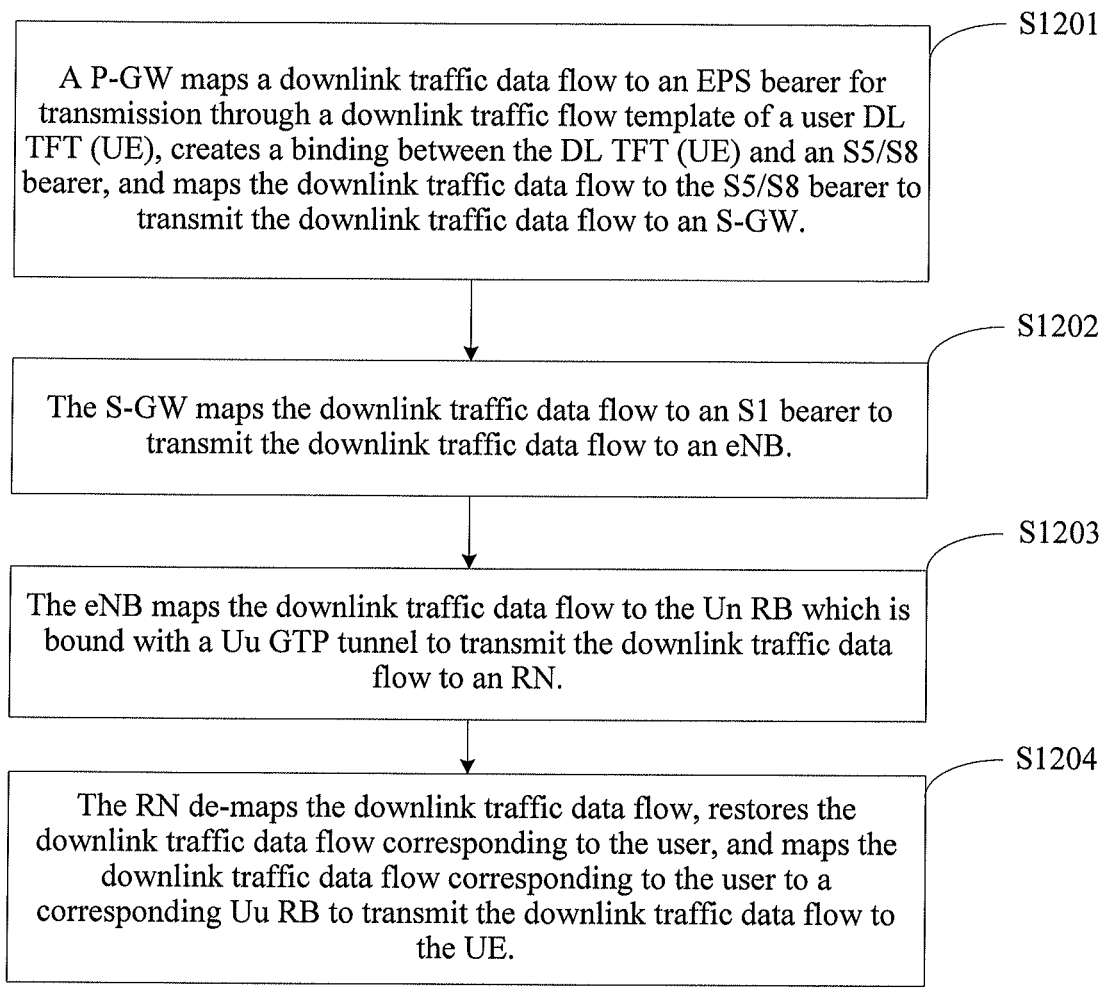
FIG. 19 is a flow chart of a downlink traffic bearer mapping method in the case of a protocol stack architecture 2 where an S1 bearer terminates at an eNB according to an embodiment of the present invention.

FIG. 19 is a flow chart of a downlink traffic bearer mapping method in the case of a protocol stack architecture 2 where an S1 bearer terminates at an eNB according to an embodiment of the present invention, which includes the following.

S1201: A P-GW maps a downlink traffic flow to an EPS bearer for transmission through a downlink traffic flow template of a user DL TFT (UE), creates a binding between the DL TFT (UE) and an S5/S8 bearer, and maps the downlink traffic data flow to the S5/S8 bearer to transmit the downlink traffic data flow to an S-GW.

Step 1201 is the same as step 401, and is not described in detail here.

S1202: The S-GW maps the downlink traffic data flow to an S1 bearer to transmit the downlink traffic data flow to an eNB.

S1203: The eNB maps the downlink traffic data flow to the Un RB which is bound with the Uu GTP tunnel to transmit the downlink traffic data flow to an RN.

After receiving the downlink traffic data flow, the eNB analyzes a data header of a data packet in the downlink traffic data flow at an IP layer, obtains attribute information of the traffic data flow of the user in the data packet. The data header includes a Un UDP/IP header, and the attribute information of the traffic data flow of the user includes predetermined information in the Un UDP/IP header.

Match the predetermined information in the Un UDP/IP header with the attribute parameter of the Un RB according to the predetermined criterion, and deliver a successfully matched data packet to the corresponding Un RB for transmission, thereby implementing the bearer binding between the Un GTP tunnel and the Un RB. The attribute parameter of the Un RB includes a QoS parameter and/or a Un RB ID.

The predetermined criterion includes, but is not limited to, a QoS requirement.

The predetermined information in the Un UDP/IP header includes, but is not limited to, an IP address, a port number, and service type indicating information.

The bearer binding operation between the Un GTP tunnel and the Un RB on the Un may be implemented in an EPS bearer setup/modifying process of the UE.

S1204: The RN de-maps the downlink traffic data flow, restores the downlink traffic data flow corresponding to the user, and maps the downlink traffic data flow corresponding to the user to a corresponding Uu RB to transmit the downlink traffic data flow to the UE.

Step 1204 is the same as step 404, and is not described in detail here.

An embodiment of the present invention provides a traffic bearer mapping method in an LTE-A network after a relay node is introduced, so as to implement the transmission of the traffic data flow in the LTE-A network, thereby ensuring the QoS of multi-service.

As for the protocol stack architecture 1 where an S1 bearer terminates at an RN, the S1 bearer transmits the EPS bearer data of the UE between the RN and the S-GW.

Figure 20:
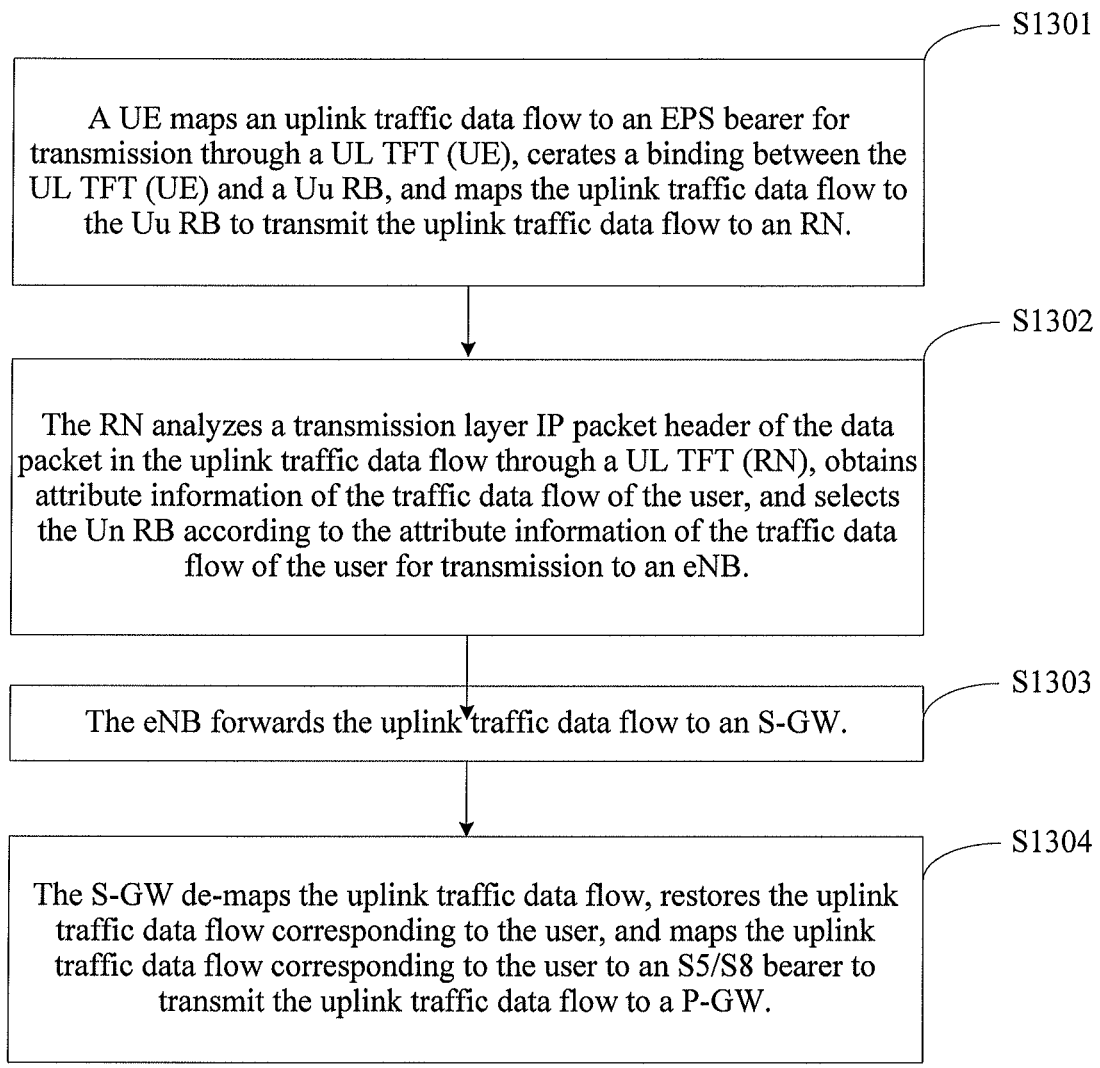
FIG. 20 is a flow chart of an uplink traffic bearer mapping method in the case of a protocol stack architecture 1 where an S1 bearer terminates at an RN according to an embodiment of the present invention.

FIG. 20 is a flow chart of an uplink traffic bearer mapping method in the case of a protocol stack architecture 1 where an S1 bearer terminates at an RN according to an embodiment of the present invention, which includes the following.

S1301: A UE maps an uplink traffic data flow to an EPS bearer for transmission through a UL TFT (UE), creates a binding between the UL TFT (UE) and a Uu RB, and maps the uplink traffic data flow to the Uu RB to transmit the uplink traffic data flow to an RN.

Step 1301 is the same as step 301, and is not described in detail here.

S1302: The RN analyzes a transport layer IP packet header of the data packet in the uplink traffic data flow through the UL TFT (RN), obtains attribute information of the traffic data flow of the user, and selects the Un RB according to the attribute information of the traffic data flow of the UE for transmission to an eNB.

The relationship between the Uu RB and the Un RB is a many-to-one mapping relationship.

The transport layer IP packet header includes a transport layer UDP/IP header, a GTP header, and a UE UDP/IP header. The RN may directly analyze the transport layer UDP/IP header of the data packet in the uplink traffic data flow through the UL TFT (RN), or may jointly analyze the transport layer UDP/IP header, the GTP header, and the UE UDP/IP header.

The selecting the Un RB according to the attribute information of the traffic data flow of the user specifically is: matching the attribute information of the traffic data flow of the user with an attribute parameter of the Un RB, and selecting a successfully matched Un RB as the Un RB, where the attribute parameter of the Un RB includes, but is limited to, a QoS parameter and/or a Un RB ID.

The attribute information of the traffic data flow of the user includes, but is not limited to, an IP address, a port number, and a service type identifier.

S1303: An eNB forwards the uplink traffic data flow to an S-GW.

The eNB merely performs the forwarding in the transport IP layer.

S1304: The S-GW de-maps the uplink traffic data flow, restores the uplink traffic data flow corresponding to the user, and maps the uplink traffic data flow corresponding to the user to an S5/S8 bearer to transmit the uplink traffic data flow to a P-GW.

Figure 21:
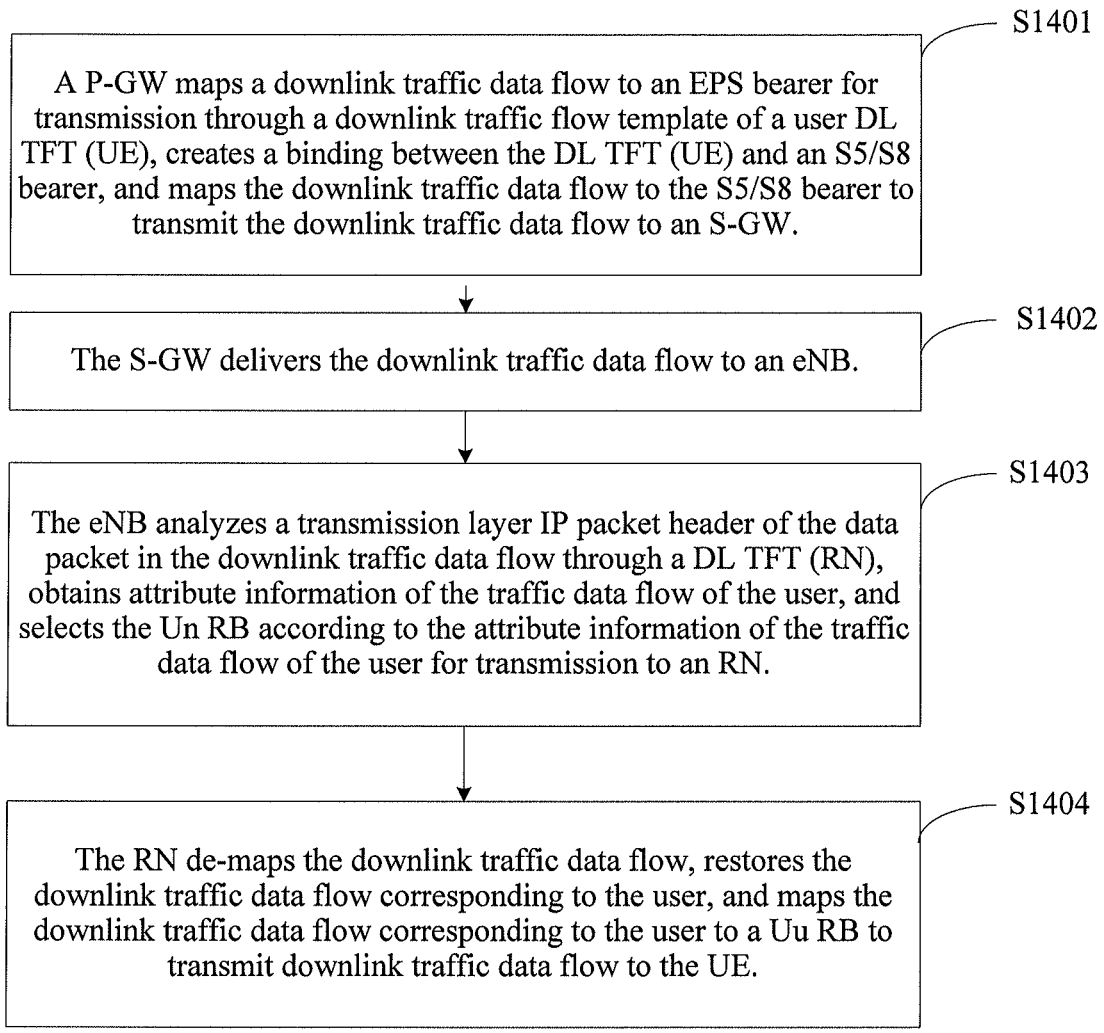
FIG. 21 is a flow chart of a downlink traffic bearer mapping method in the case of a protocol stack architecture 1 where an S1 bearer terminates at an RN according to an embodiment of the present invention.

FIG. 21 is a flow chart of a downlink traffic bearer mapping method in the case of a protocol stack architecture 1 where an S1 bearer terminates at an RN according to an embodiment of the present invention, which includes the following.

S1401: A P-GW maps a downlink traffic flow to an EPS bearer for transmission through a downlink traffic flow template of a user DL TFT (UE), creates a binding between the DL TFT (UE) and an S5/S8 bearer, and maps the downlink traffic data flow to the S5/S8 bearer to transmit the downlink traffic data flow to an S-GW.

Step 1401 is the same as step 401, and is not described in detail here.

S1402: The S-GW delivers the downlink traffic data flow to an eNB.

S1403: The eNB analyzes a transport layer IP packet header of the data packet in the downlink traffic data flow through the DL TFT (RN), obtains attribute information of the traffic data flow of the user, and selects the Un RB according to the attribute information of the traffic data flow of the UE for transmission to an RN.

The eNB analyzes a transport layer IP packet header of a data packet in the downlink traffic data flow through the DL TFT (RN), obtains the attribute information of the traffic data flow of the user, and selects a predetermined Un RB according to the attribute information of the traffic data flow of the user.

The transport layer IP packet header includes a transport layer UDP/IP header, a GTP header, and a UE UDP/IP header. The eNB may directly analyze the transport layer UDP/IP header of the data packet in the downlink traffic data flow through the UL TFT (RN), or may jointly analyze the transport layer UDP/IP header, the GTP header, and the UE UDP/IP header.

The selecting the Un RB according to the attribute information of the traffic data flow of the user specifically is: matching the attribute information of the traffic data flow of the user with an attribute parameter of the Un RB, and selecting a successfully matched Un RB as the Un RB, where the attribute parameter of the Un RB includes, but is not limited to, a QoS parameter and/or a Un RB ID.

The attribute information of the traffic data flow of the user includes, but is not limited to, an IP address, a port number, and a service type identifier.

S1404: The RN de-maps the downlink traffic data flow, restores the downlink traffic data flow corresponding to the user, and maps the downlink traffic data flow corresponding to the user to a Uu RB to transmit the downlink traffic data flow to the UE.

The restored downlink traffic data flow corresponding to the user is the traffic data flow of the S1 bearer. The downlink traffic data flow corresponding to the user is delivered to the UE according to the one-to-one mapping relationship between the S1 bearer and the Uu RB.

An embodiment of the present invention provides a traffic bearer mapping method in an LTE-A network after a relay node is introduced, so as to implement the transmission of the traffic data flow in the LTE-A network, thereby ensuring the QoS of multi-service.

Figure 22:
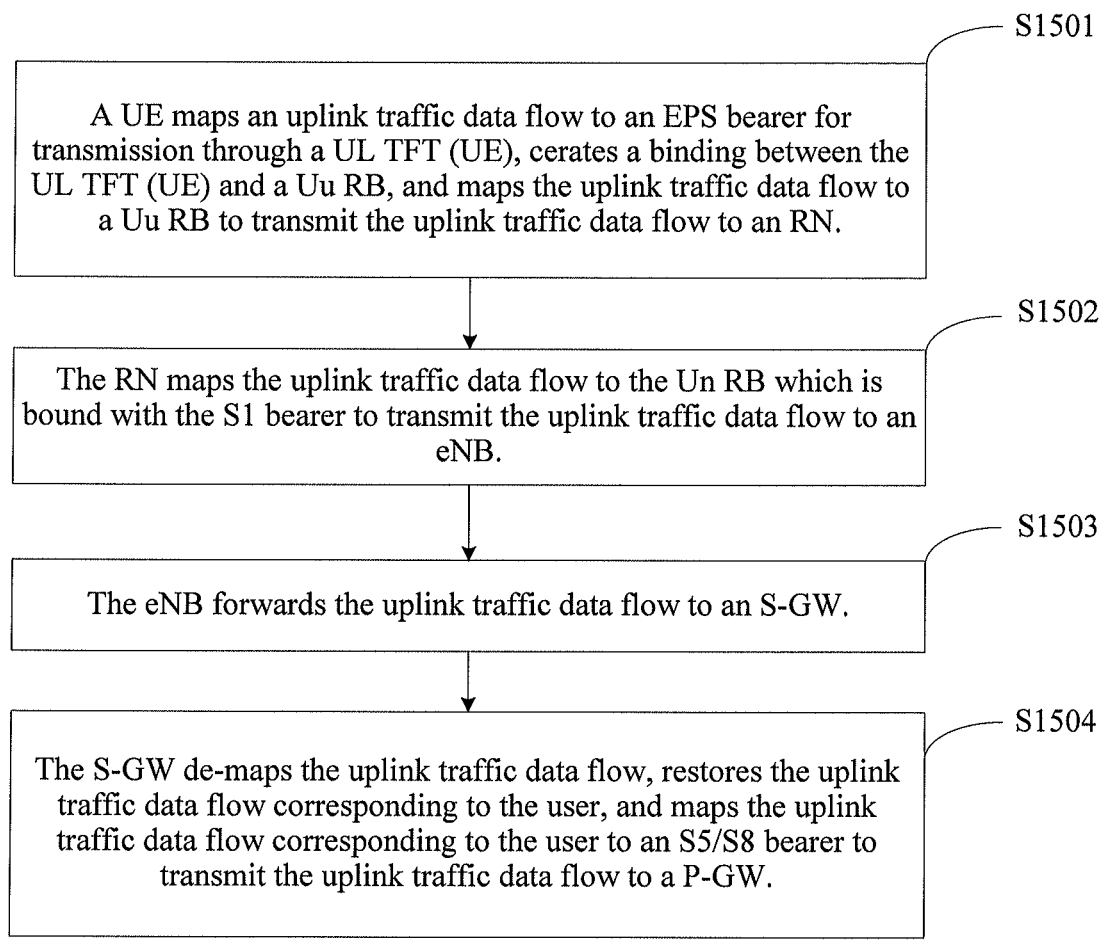
FIG. 22 is a flow chart of an uplink traffic bearer mapping method in the case of a protocol stack architecture 1 where an S1 bearer terminates at an RN according to an embodiment of the present invention.

FIG. 22 is a flow chart of an uplink traffic bearer mapping method in the case of a protocol stack architecture 1 where an S1 bearer terminates at an RN according to an embodiment of the present invention, which includes the following.

S1501: A UE maps an uplink traffic data flow to an EPS bearer for transmission through a UL TFT (UE), creates binding between a UL TFT (UE) and a Uu RB, and maps the uplink traffic data flow to a Uu RB to transmit the uplink traffic data flow to an RN.

Step 1501 is the same as step 301, and is not described in detail here.

S1502: The RN maps the uplink traffic data flow to the Un RB which is bound with the S1 bearer to transmit the uplink traffic data flow to an eNB.

Before the uplink traffic data flow is transmitted, a core network end and an RN end perform control signaling interaction, where the control signaling includes attribute information of the traffic data flow of the user of the uplink traffic data flow to be transmitted, and the control signaling interaction process includes an EPS bearer setup/modifying process.

The RN encapsulates the uplink traffic data flow received from a Uu interface to a corresponding S1 bearer according to the one-to-one mapping relationship between the Uu RB and the S1 bearer.

The RN binds each S1 bearer with a specific Un RB according to a relevant criterion (for example, a QoS parameter), which is specifically as follows.

The RN obtains the attribute information of the traffic data flow of the user from the control signaling interaction process, where the attribute information of the traffic data flow of the user includes a TEID of the S1 bearer.

Match the TEID of the S1 bearer with the Un RB ID of the Un RB, and bind a successfully matched Un RB with the corresponding S1 bearer.

The relationship between the S1 bearer and the Un RB is a many-to-one mapping relationship.

The uplink traffic data flow is delivered from the S1 bearer to the Un RB which is bound with the S1 bearer for transmission.

S1503: The eNB forwards the uplink traffic data flow to an S-GW.

The eNB merely performs the forwarding in the transport IP layer.

S1504: The S-GW de-maps the uplink traffic data flow, restores the uplink traffic data flow corresponding to the user, and maps the uplink traffic data flow corresponding to the user to an S5/S8 bearer to transmit the uplink traffic data flow to a P-GW.

Figure 23:
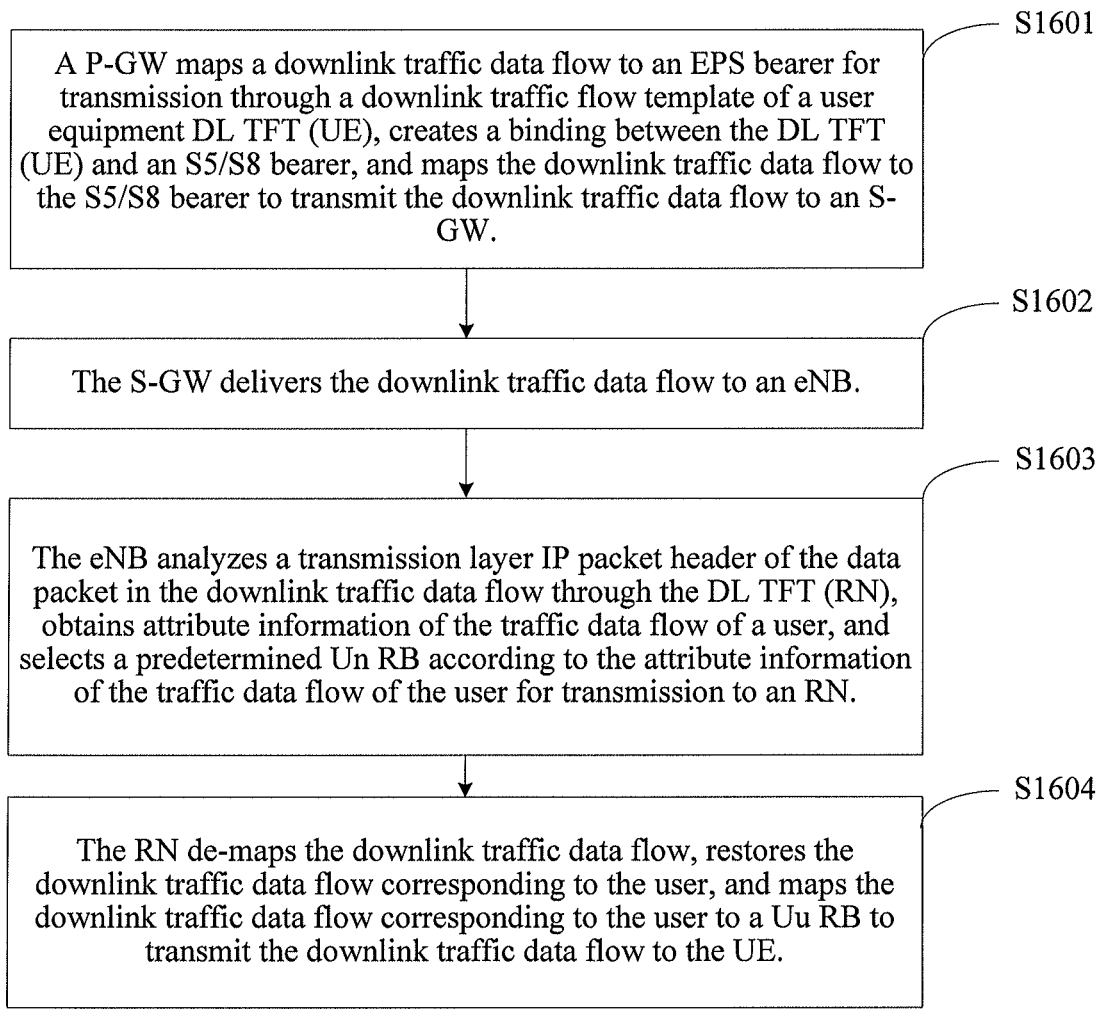
FIG. 23 is a flow chart of a downlink traffic bearer mapping method in the case of a protocol stack architecture 1 where an S1 bearer terminates at an RN according to an embodiment of the present invention.

FIG. 23 is a flow chart of a downlink traffic bearer mapping method in the case of a protocol stack architecture 1 where an S1 bearer terminates at an RN according to an embodiment of the present invention, which includes the following.

S1601, a P-GW maps a downlink traffic flow to an EPS bearer for transmission through a downlink traffic flow template of a user DL TFT (UE) of the user, creates a binding between the DL TFT (UE) and an S5/S8 bearer, and maps the downlink traffic data flow to the S5/S8 bearer to transmit the downlink traffic data flow to an S-GW.

Step 1601 is the same as step 401, and is not described in detail here.

S1602: The S-GW delivers the downlink traffic data flow to an eNB.

S1603: The eNB analyzes a transport layer IP packet header of the data packet in the downlink traffic data flow through the DL TFT (RN), obtains attribute information of the traffic data flow of the user, and selects a predetermined Un RB according to the attribute information of the traffic data flow of the user for transmission to an RN.

The eNB analyzes a transport layer IP packet header of a data packet in the downlink traffic data flow through the DL TFT (RN), obtains the attribute information of the traffic data flow of the user, and selects a predetermined Un RB according to the attribute information of the traffic data flow of the user.

The transport layer IP packet header includes a transport layer UDP/IP header, a GTP header and a UE UDP/IP header. The eNB may directly analyze the transport layer UDP/IP header of the data packet in the downlink traffic data flow through the UL TFT (RN), or may jointly analyze the transport layer UDP/IP header, the GTP header, and the UE UDP/IP header.

The selecting a predetermined Un RB according to the attribute information of the traffic data flow of the user specifically is: matching the attribute information of the traffic data flow of the user with an attribute parameter of the Un RB, and selecting a successfully matched Un RB as the predetermined Un RB, where the attribute parameter of the Un RB includes, but is not limited to, a QoS parameter and/or a Un RB ID.

The attribute information of the traffic data flow of the use equipment includes, but is not limited to, an IP address, a port number, and a service type identifier.

S1604: An RN de-maps the downlink traffic data flow, restores the downlink traffic data flow corresponding to the user, and maps the downlink traffic data flow corresponding to the user to a Uu RB to transmit the DL traffic data flow to the UE.

The restored downlink traffic data flow corresponding to the user is the traffic data flow of the S1 bearer. The downlink traffic data flow corresponding to the user is delivered to the UE according to the one-to-one mapping relationship between the S1 bearer and the Uu RB.

An embodiment of the present invention provides a traffic bearer mapping method in an LTE-A network after a relay node is introduced, so as to implement the transmission of a traffic data flow in the LTE-A network, thereby ensuring the QoS of multi-service.

Figure 24:
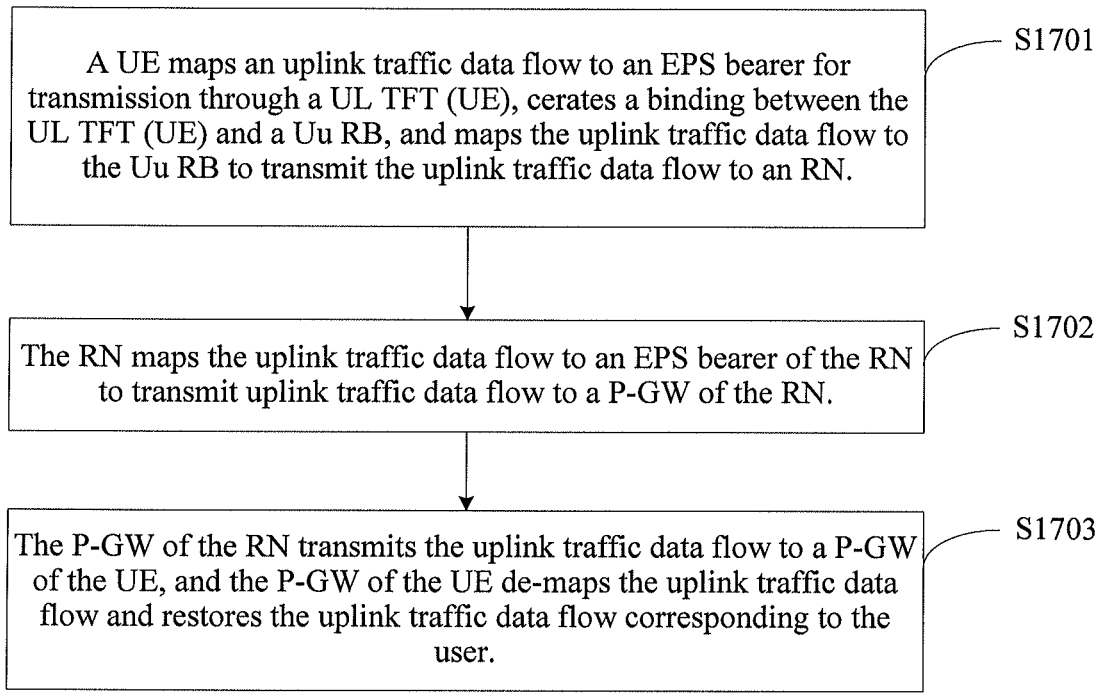
FIG. 24 is a flow chart of an uplink traffic bearer mapping method in the case of a protocol stack architecture 2 where an S1 bearer terminates at an RN according to an embodiment of the present invention.

FIG. 24 is a flow chart of an uplink traffic bearer mapping method in the case of a protocol stack architecture 2 where an S1 bearer terminates at an RN according to an embodiment of the present invention, which includes the following.

As for the protocol stack architecture 2 where an S1 bearer terminates at an RN, the S1 bearer transmits an EPS bearer data of the UE between the S-GW/P-GW of the RN and the UE.

In Embodiment 8, the EPS bearer of the RN is the bearer between the RN and the P-GW of the RN. The protocol of the P-GW of the RN is the same as the protocol of the S-GW of the RN, and the protocol of the P-GW of the UE is the same as the protocol of the S-GW of the UE. In order to facilitate description, the P-GW and the S-GW of the RN may be used as an equipment, and the P-GW and the S-GW of the UE may also be used as an equipment, as shown in FIG. 8.

In this embodiment, the P-GW and the S-GW of the UE are the same as the P-GW and the S-GW in other embodiments, and are expressed in this manner to distinguish from P-GW of the RN and the S-GW of the RN in the present invention.

An uplink bear mapping process in an LTE-A network is as shown in FIG. 24, which includes the following.

S1701: A UE maps an uplink traffic data flow to an EPS bearer for transmission through a UL TFT (UE), creates a binding between a UL TFT (UE) and a Uu RB, and maps the uplink traffic data flow to a Uu RB to transmit the uplink traffic data flow to an RN.

The UE analyzes a UE UDP/IP header of a data packet in the uplink traffic data flow of an IP layer of the UE through the UL TFT (UE), matches the UE UDP/IP header with an attribute of the EPS bearer according to an analysis result, and maps the uplink traffic data flow to a successfully matched EPS bearer for transmission. The EPS bearer is the EPS bearer of the user. The relationship between the EPS bearer and the Uu RB is a one-to-one mapping relationship. Each EPS bearer on the Uu interface is mapped to a Uu RB, and therefore the uplink traffic data flow is also correspondingly mapped to a Un RB and is transmitted to an RN.

After creating the binding between the UL TFT (UE) and the Uu RB, the UE records a mapping relationship between the UL TFT (UE) and the Uu RB, thereby creating the uplink mapping between the uplink traffic data flow and the Uu RB.

S1702: The RN maps the uplink traffic data flow to an EPS bearer of the RN to transmit the uplink traffic data flow to the P-GW of the RN.

The mapping the uplink traffic data flow to the EPS bearer of the RN includes the following.

The RN analyzes a transport layer IP packet header of a data packet in the uplink traffic data flow through the UL TFT (RN), obtains attribute information of the traffic data flow of the user, and selects a predetermined EPS bearer of the RN according to the attribute information of the traffic data flow of the user.

The relationship between the Uu RB and the EPS bearer of the RN is a many-to-one mapping relationship.

The transport layer IP packet header includes a transport layer UDP/IP header, a GTP header, and a UE UDP/IP header. The RN may directly analyze the transport layer UDP/IP header of the data packet in the uplink traffic data flow through the UL TFT (RN), or may jointly analyze the transport layer UDP/IP header, the GTP header, and the UE UDP/IP header.

The attribute information of the traffic data flow of the user includes, but is not limited to, an IP address, a port number, and a service type identifier.

The selecting the predetermined EPS bearer of the RN according to the attribute information of the traffic data flow of the user specifically is: matching the attribute information of the traffic data flow of the user with an attribute parameter of EPS bearer of the RN, and selecting a successfully matched EPS bearer of the RN as the predetermined EPS bearer of the RN.

The uplink traffic data flow is mapped by the RN to the predetermined EPS bearer of the RN, and is transmitted to the P-GW of the RN through an eNB.

S1703: The P-GW of the RN transmits the uplink traffic data flow to the P-GW of the UE, and the P-GW of the UE de-maps the uplink traffic data flow, and restores the uplink traffic data flow corresponding to the user.

Figure 25:
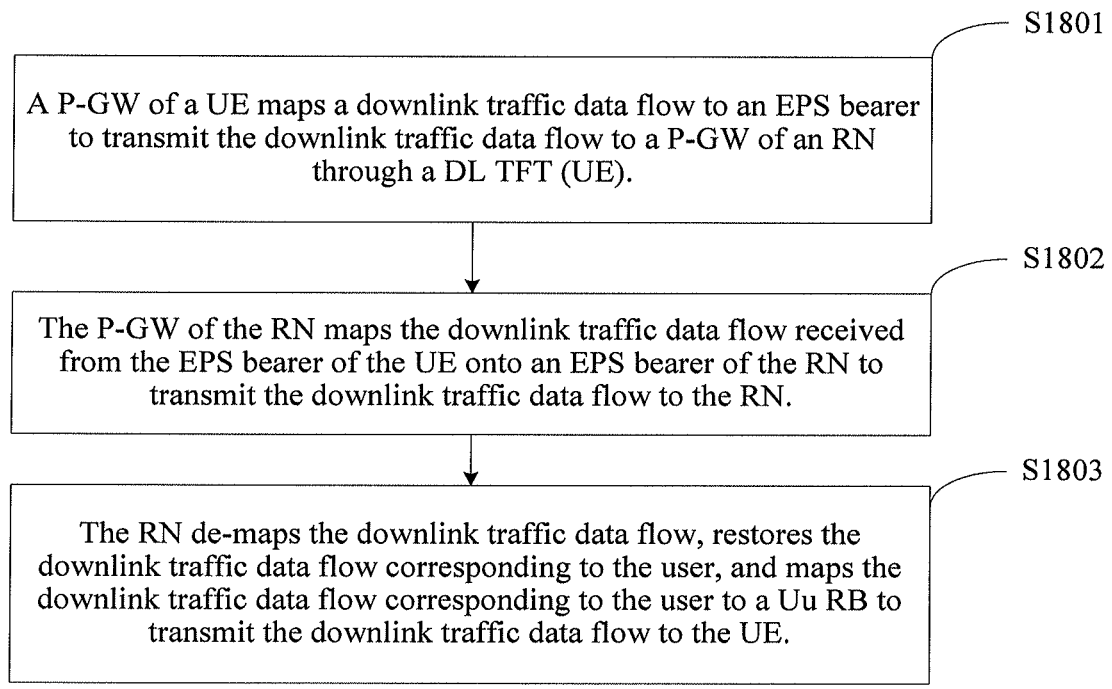
FIG. 25 is a flow chart of a downlink traffic bearer mapping method in the case of a protocol stack architecture 2 where an S1 bearer terminates at an RN according to an embodiment of the present invention.

FIG. 25 is a flow chart of a downlink traffic bearer mapping method in the case of a protocol stack architecture 2 where an S1 bearer terminates at an RN according to an embodiment of the present invention, which includes the following S1801: A P-GW of the UE maps a downlink traffic data flow to an EPS bearer to transmit the downlink traffic data flow to the P-GW of the RN through a DL TFT (UE).

The P-GW of the UE analyzes a UE UDP/IP header of a data packet in the downlink traffic data flow of an IP layer of the UE through the DL TFT (UE), matches the UE UDP/IP header with an attribute of the EPS bearer according to an analysis result, and maps the downlink traffic data flow to a successfully matched EPS bearer for transmission. The EPS bearer is the EPS bearer of a UE. The relationship between the DL TFT (UE) and the EPS bearer is a one-to-one mapping relationship. The P-GW of the UE delivers the uplink traffic data flow to the P-GW of the RN through a transport layer.

S1802: The P-GW of the RN maps the downlink traffic data flow received from the EPS bearer of the UE to the EPS bearer of the RN to transmit the downlink traffic data flow to the RN.

The mapping the downlink traffic data flow to the predetermined EPS bearer of the RN includes the following.

The P-GW of the RN analyzes a transport layer IP packet header of a data packet in the downlink traffic data flow through the DL TFT (RN), obtains attribute information of the traffic data flow of the user, and selects the predetermined EPS bearer of the RN according to the attribute information of the traffic data flow of the user.

The relationship between the EPS bearer of the UE and the EPS bearer of the RN is a many-to-one mapping relationship.

The transport layer IP packet header includes a transport layer UDP/IP header, a GTP header, and a UE UDP/IP header. The P-GW of the RN may directly analyze the transport layer UDP/IP header of the data packet in the downlink traffic data flow through the DL TFT (RN), or may jointly analyze the transport layer UDP/IP header, the GTP header, and the UE UDP/IP header.

The attribute information of the traffic data flow of the user includes, but is not limited to, an IP address, a port number, and a service type identifier.

The selecting the predetermined EPS bearer of the RN according to the attribute information of the traffic data flow of the user specifically is: matching the attribute information of the traffic data flow of the user with an attribute parameter of EPS bearer of the RN, and selecting a successfully matched EPS bearer of the RN as the predetermined EPS bearer of the RN.

The downlink traffic data flow is mapped by the P-GW of the RN to the predetermined EPS bearer of the RN, and is transmitted to the RN through an eNB.

S1803: An RN de-maps the downlink traffic data flow, restores the downlink traffic data flow corresponding to the user, and maps the downlink traffic data flow corresponding to the user to a Uu RB to transmit the downlink traffic data flow to the UE.

The de-mapping is one-to-many de-mapping.

An embodiment of the present invention provides a traffic bearer mapping method in an LTE-A network after a relay node is introduced, so as to implement the transmission of the traffic data flow in the LTE-A network, thereby ensuring the QoS of multi-service.

Figure 26:
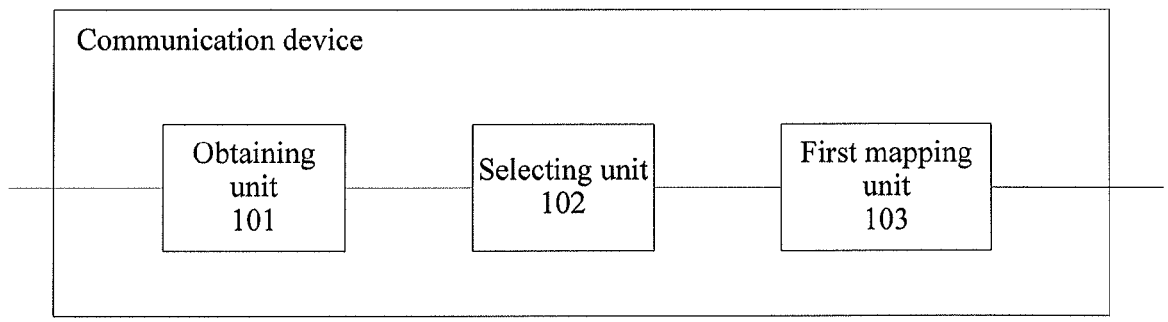
FIG. 26 is a block diagram of a communication device according to an embodiment of the present invention.

On the basis of the traffic bearer mapping method, an embodiment of the present invention further provides a communication device. FIG. 26 is a block diagram of a communication device according to an embodiment of the present invention, which includes the following.

The obtaining unit 101 is configured to obtain attribute information of a traffic data flow of a user.

The attribute information of the traffic data flow of the user includes, but is not limited to, an IP address, a port number, a service type identifier, a TEID, a UE ID, a Uu RB ID, or a logical channel identifier.

The obtaining unit 101 includes:

a receiving sub-unit, configured to receive the traffic data flow; and an analyzing and obtaining unit, configured to analyze a data packet header of a data packet of the traffic data flow, and obtain the attribute information of the traffic data flow of the user from the data packet header.

The data packet header includes, but is not limited to, a UE UDP/IP header, a Un GTP header, or a Un UDP/IP header. In the embodiment of the present invention, a transport layer UDP/IP header, a GTP header, and a UE UDP/IP header in the transport layer IP packet header may also be jointly analyzed to obtain the attribute information of the traffic data flow of the user.

As for the specific analysis of the data packet header of the data packet of the traffic data flow, details are made to the description of the traffic bearer mapping method and are not described here.

Alternatively, the obtaining unit 101 may also include:

an obtaining sub-unit, configured to obtain the attribute information of the traffic data flow of the user from a control signaling interaction process, where the control signaling interaction process includes an EPS bearer setup/modifying process.

Before the traffic data flow is transmitted, a network side and the RN end or the eNB end perform control signaling interaction, where the control signaling includes the attribute information of the traffic data flow of the user of the traffic data flow to be transmitted.

The selecting unit 102 is configured to select a relay transmission tunnel according to the attribute information of the traffic data flow of the user.

The selecting the relay transmission tunnel according to the attribute information of the traffic data flow of the user includes:

matching the attribute information of the traffic flow of the user with an at tribute parameter of a Un RB; and selecting a successfully matched Un RB as the relay transmission tunnel, where the attribute information of the traffic flow of the user includes an IP address, a port number, or a service type identifier, and the attribute parameter of the Un RB include a QoS parameter and/or a Un RB ID.

Alternatively, the selecting the relay transmission tunnel according to the traffic data flow of the user include:

matching the attribute information of the traffic flow of the user with the attribute parameter of the Un RB, where the attribute information of the traffic flow of the user includes a Un tunnel endpoint identifier TEID, and the attribute parameter of the Un RB include the QoS parameter and/or the Un RB ID;

binding a successfully matched Un TEID with the Un RB ID to implement the bearer binding between the Un GTP tunnel and the Un RB; and selecting the successfully matched Un RB as the relay transmission tunnel.

Alternatively, the selecting the relay transmission tunnel according to the traffic data flow of the UE includes:

matching the attribute information of the traffic data flow of the user with the attribute parameter of the EPS bearer of the RN; and selecting a successfully matched EPS bearer of the RN as the relay transmission tunnel, where the relay transmission tunnel includes a Un RB.

The method for selecting the relay transmission tunnel according to the attribute information of the traffic data flow of the user is the same as the method for selecting the predetermined relay transmission tunnel in the above traffic bearer mapping method. As for the details, reference is made to the description of the above traffic bearer mapping method, and is not described here.

The first mapping unit 103 is configured to map the received traffic data flow to the relay transmission tunnel for transmission, where the relay transmission tunnel includes a Un RB or a bearer including the Un RB.

The bearer including the Un RB includes an EPS bearer of an RN.

The communication device is a relay node RN, a base station eNB, or a packet data network gateway P-GW of the RN.

As for the specific method for mapping the received traffic data flow to the relay transmission tunnel, details are made to the description of the above traffic bearer mapping method and are not described here.

Figure 27:
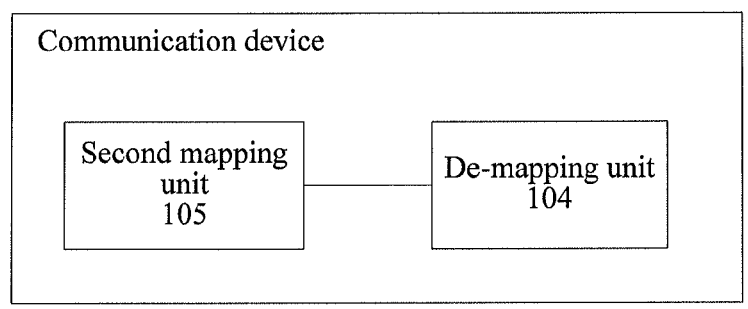
FIG. 27 is a block diagram of another communication device according to an embodiment of the present invention.

FIG. 27 is a block diagram of another communication device according to an embodiment of the present invention, which includes:

a de-mapping unit 104, configured to de-map a received traffic data flow and restore the traffic data flow corresponding to a user; and a second mapping unit 105, configured to map the traffic data flow corresponding to the user to a predetermined bearer for transmission.

The communication device is a base station, a serving gateway S-GW or a packet data network gateway P-GW, or a relay node RN.

An embodiment of the present invention provides a traffic bearer mapping device in an LTE-A network after a relay node is introduced, so as to implement the transmission of the traffic data flow in the LTE-A network, thereby ensuring the QoS of multi-service.

Through the above descriptions of the implementation, persons skilled in the art may clearly understand that the present invention may be accomplished through software plus a necessary universal hardware platform. Based on this, the above technical solution or the part that makes contributions to the prior art may be substantially embodied in the form of a software product. The computer software product may be stored in a computer readable storage medium such as a ROM/RAM, a magnetic disk or an optical disk, and include several instructions used to instruct computer equipment (for example, a personal computer, a server, or network equipment) to perform the method described in the embodiments of the present invention or in some parts of the embodiments.

The above descriptions are merely exemplary embodiments of the present invention, but are not intended to limit the present invention in any forms. The present invention has been disclosed through exemplary embodiments, but is not intended to be limited thereto. Any persons killed in the art may make various variations and modifications to the technical solutions of the present invention, or modify to equivalent embodiments with the same change by using the above disclosed methods and technical content without departing from the scope of the technical solutions of the present invention. Therefore, any modification, equivalent replacement, or improvement made to the above embodiments on the basis of the technical essence of the present invention without departing from the content of the technical solutions of the present invention should fall within the protection scope of the technical solutions of the present invention.

What is claimed is:

1. A traffic bearer mapping method, comprising:
receiving, by a communication device, a traffic data flow of a user equipment;
obtaining, by the communication device, attribute information of the traffic data flow, wherein the attribute information of the traffic data flow is located in a user datagram protocol/Internet protocol (UDP/IP) header; and
selecting, by the communication device, a relay transmission tunnel according to the attribute information of the traffic data flow, wherein the relay transmission tunnel comprises a relay link radio bearer (Un RB); and
mapping, by the communication device, the traffic data flow to the relay transmission tunnel for transmission.

2. wherein when a backhaul terminates at a base station, the obtaining the attribute information of the traffic data flow comprises:
analyzing a data packet header of a data packet of the traffic data flow to obtain the attribute information of the traffic data flow.

3. The method according to claim 2, wherein the selecting the relay transmission tunnel according to the attribute information of the traffic data flow comprises:
matching the attribute information of the traffic data flow with an attribute parameter of the Un RB, wherein the attribute information of the traffic data flow comprises predetermined information in a Un UDP/IP header, and the attribute parameter of the Un RB comprises at least one of a QoS parameter and a Un RB ID;
binding a matched predetermined information in the Un UDP/IP header with the attribute parameter of the Un RB to implement bearer binding between a Un GTP tunnel and the Un RB; and
selecting a matched Un RB as the relay transmission tunnel.

4. The method according to claim 1, wherein when a backhaul terminates at a relay node (RN), the obtaining the attribute information of the traffic data flow comprises:
analyzing a transport layer IP packet header of a data packet of the traffic data flow to obtain the attribute information of the traffic data flow.

5. The method according to claim 1, wherein an attribute parameter of the Un RB is matched with the attribute information of the traffic data flow, the attribute parameter of the Un RB comprises one or both of a quality of service (QoS) parameter and a Un RB identifier (Un RB ID), and the attribute information of the traffic data flow comprises one or more of an IP address, a port number, and a service type identifier.

6. The method according to claim 1, wherein the attribute information of the traffic data flow is located in a transport layer UDP/IP header.

7. The method according to claim 1, wherein the communication device is a relay node (RN), and the traffic data flow is an uplink traffic data flow; or
the communication device is a base station or a packet data network gateway (P-GW), and the traffic data flow is an downlink traffic data flow.

8. A communication device, comprising:
a receiving unit, configured to receive a traffic data flow of a user equipment;
an obtaining unit, configured to obtain attribute information of the traffic data flow, wherein the attribute information of the traffic data flow is located in a user datagram protocol/Internet protocol (UDP/IP) header;
a selecting unit, configured to select a relay transmission tunnel according to the attribute information of the traffic data flow, wherein the relay transmission tunnel comprises a relay link radio bearer (Un RB); and
a mapping unit, configured to map the traffic data flow to the relay transmission tunnel for transmission.

9. The communication device according to claim 8, wherein when a backhaul terminates at a relay node (RN), the obtaining unit is configured to analyze a transport layer IP packet header of a data packet of the traffic data flow to obtain the attribute information of the traffic data flow.

10. The communication device according to claim 8, wherein an attribute parameter of the Un RB is matched with the attribute information of the traffic data flow, the attribute parameter of the Un RB comprises one or both of a quality of service (QoS) parameter and a Un RB identifier (Un RB ID), and the attribute information of the traffic data flow comprises one or more of an IP address, a port number, and a service type identifier.

11. The communication device according to claim 8, the attribute information of the traffic data flow is located in a transport layer UDP/IP header.

12. The communication device according to claim 8, wherein when a backhaul terminates at a base station, the obtaining unit is configured to analyze a data packet header of a data packet of the traffic data flow to obtain the attribute information of the traffic data flow.

13. The communication device according to claim 12, wherein the selecting unit is configured to match the attribute information of the traffic data flow with an attribute parameter of the Un RB, wherein the attribute information of the traffic data flow comprises predetermined information in a Un UDP/IP header, and the attribute parameter of the Un RB comprises one or both of a QoS parameter and a Un RB ID; to bind a matched predetermined information in the Un UDP/IP header with the attribute parameter of the Un RB to implement bearer binding between a Un GTP tunnel and the Un RB; and to select a matched Un RB as the relay transmission tunnel.

14. The communication device according to claim 8, wherein the communication device is a relay node (RN), and the traffic data flow is an uplink traffic data flow; or
the communication device is a base station or a packet data network gateway (P-GW), and the traffic data flow is an downlink traffic data flow.

* * * * *